(12) United States Patent
Liang et al.

(10) Patent No.: US 6,649,037 B2
(45) Date of Patent: Nov. 18, 2003

(54) ELECTRODEIONIZATION APPARATUS AND METHOD

(75) Inventors: Li-Shiang Liang, Harvard, MA (US); Anil Jha, Lincoln, MA (US); John Arba, Bradford, MA (US); Stephane Dupont, Elancourt (FR)

(73) Assignee: United States Filter Corporation, Palm Desert, CA (US)

( * ) Notice: Subject to any disclaimer, the term of this patent is extended or adjusted under 35 U.S.C. 154(b) by 0 days.

(21) Appl. No.: 09/867,786

(22) Filed: May 29, 2001

(65) Prior Publication Data

US 2002/0189951 A1 Dec. 19, 2002

(51) Int. Cl.[7] ............................. C02F 1/469; C02F 1/40
(52) U.S. Cl. ..................... 204/632; 204/542; 204/633
(58) Field of Search ................... 204/627, 630, 204/632, 633, 634, 542

(56) References Cited

U.S. PATENT DOCUMENTS

| | | | |
|---|---|---|---|
| 2,514,415 A | 7/1950 | Rasch ........................... 136/26 |
| 2,681,319 A | 6/1954 | Bodamer ..................... 260/2.1 |
| 2,681,320 A | 6/1954 | Bodamer ..................... 260/2.2 |
| 2,788,319 A | 4/1957 | Pearson ....................... 204/151 |
| 2,794,777 A | 6/1957 | Pearson ....................... 204/151 |
| 2,815,320 A | 12/1957 | Kollsman .................... 204/180 |
| 2,854,394 A | 9/1958 | Kollsman .................... 204/180 |
| 2,923,674 A | 2/1960 | Kressman .................... 204/180 |
| 2,943,989 A | 7/1960 | Kollsman .................... 204/301 |
| 3,014,855 A | 12/1961 | Kressman .................... 204/180 |
| 3,074,864 A | 1/1963 | Gaysowski ................... 204/151 |
| 3,099,615 A | 7/1963 | Kollsman .................... 204/180 |
| 3,148,687 A | 9/1964 | Dosch ........................... 134/58 |
| 3,149,061 A | 9/1964 | Parsi ............................ 204/180 |
| 3,149,062 A | 9/1964 | Gottschal et al. ............ 204/301 |
| 3,165,460 A | 1/1965 | Zang et al. ................... 204/301 |
| 3,291,713 A | 12/1966 | Parsi ............................ 204/180 |
| 3,330,750 A | 7/1967 | McRae et al. ............... 204/180 |
| 3,341,441 A | 9/1967 | Giuffrida et al. ............ 204/180 |
| 3,375,208 A | 3/1968 | Duddy ......................... 260/2.1 |
| 3,627,703 A | 12/1971 | Kojima et al. ............ 260/2.1 E |
| 3,645,884 A | 2/1972 | Gilliland ...................... 204/301 |
| 3,686,089 A | 8/1972 | Korngold ................ 204/180 F |
| 3,755,135 A | 8/1973 | Johnson ....................... 204/301 |
| 3,869,376 A | 3/1975 | Tejeda ......................... 204/301 |
| 3,870,033 A | 3/1975 | Faylor et al. ............. 126/360 R |
| 3,876,565 A | 4/1975 | Takashima et al. ...... 260/2.1 R |
| 3,989,615 A | 11/1976 | Kiga et al. ................... 204/252 |
| 4,032,452 A | 6/1977 | Davis ........................... 210/243 |

(List continued on next page.)

FOREIGN PATENT DOCUMENTS

| | | |
|---|---|---|
| AU | B-18629/92 | 10/1992 |
| CA | 2316012 A1 | 11/2001 |
| CN | 1044411 A | 8/1990 |

(List continued on next page.)

OTHER PUBLICATIONS

Wood, Jonathan et al., "The Use of Hot Water for Sanitation of RO Membranes in Ultrapure Water Systems," U.S. Filter/Ionpure Inc., Lowell, MA USA. Presented at The 1997 Fifteenth Annual Membrane Technology/Separations Planning Conference. Sponsored by Business Communications Co., Inc. Newton, Massachusetts, Oct. 29, 1997. pp. 1–10.

(List continued on next page.)

*Primary Examiner*—Patrick Ryan
*Assistant Examiner*—Thomas H. Parsons
(74) *Attorney, Agent, or Firm*—Wolf, Greenfield & Sacks, P.C.

(57) ABSTRACT

An electrodeionization apparatus and method for purifying a fluid. A fluid, such as water, can be purified by removing weakly ionizable species from the fluid. Weakly ionizable species may be dissociated at different pH levels to facilitate removal from the fluid in an electrodeionization device.

42 Claims, 7 Drawing Sheets

U.S. PATENT DOCUMENTS

| | | | |
|---|---|---|---|
| 4,033,850 A | 7/1977 | Kedem et al. | 204/301 |
| 4,089,758 A | 5/1978 | McAloon | 204/98 |
| 4,116,889 A | 9/1978 | Chlanda et al. | 521/27 |
| 4,119,581 A | 10/1978 | Rembaum et al. | 521/27 |
| 4,130,473 A | 12/1978 | Eddleman | 204/252 |
| 4,153,761 A | 5/1979 | Marsh | 521/26 |
| 4,167,551 A | 9/1979 | Tamura et al. | 521/27 |
| 4,191,811 A | 3/1980 | Hodgdon | 521/27 |
| 4,197,206 A | 4/1980 | Karn | 210/321 A |
| 4,216,073 A | 8/1980 | Goldstein | 204/296 |
| 4,217,200 A | 8/1980 | Kedem et al. | 204/301 |
| 4,226,688 A | 10/1980 | Kedem et al. | 204/180 P |
| 4,228,000 A | 10/1980 | Hoeschler | 210/673 |
| 4,294,933 A | 10/1981 | Kihara et al. | 521/27 |
| 4,298,442 A | 11/1981 | Giuffrida | 204/180 P |
| 4,321,145 A | 3/1982 | Carlson | 210/678 |
| 4,330,654 A | 5/1982 | Ezzell et al. | 526/243 |
| 4,358,545 A | 11/1982 | Ezzell et al. | 521/27 |
| 4,374,232 A | 2/1983 | Davis | 525/243 |
| 4,430,226 A | 2/1984 | Hegde et al. | 210/638 |
| 4,465,573 A | 8/1984 | O'Hare | 204/180 P |
| 4,473,450 A | 9/1984 | Nayak et al. | 204/147 |
| 4,505,797 A | 3/1985 | Hodgdon et al. | 204/252 |
| 4,574,049 A | 3/1986 | Pittner | 210/639 |
| 4,614,576 A | 9/1986 | Goldstein | 204/299 R |
| 4,632,745 A | 12/1986 | Giuffrida et al. | 204/301 |
| 4,636,296 A | 1/1987 | Kunz | 204/182.5 |
| 4,661,411 A | 4/1987 | Martin et al. | 428/421 |
| 4,671,863 A | 6/1987 | Tejeda | 204/266 |
| 4,687,561 A | 8/1987 | Kunz | 204/182.5 |
| 4,702,810 A | 10/1987 | Kunz | 204/182.4 |
| 4,707,240 A | 11/1987 | Parsi et al. | 204/290 F |
| 4,747,929 A | 5/1988 | Siu et al. | 204/301 |
| 4,747,955 A | 5/1988 | Kunin | 210/679 |
| 4,751,153 A | 6/1988 | Roth | 429/35 |
| 4,753,681 A | 6/1988 | Giuffrida et al. | 134/22.17 |
| 4,770,793 A | 9/1988 | Treffry-Goatley et al. | 210/769 |
| 4,804,451 A | 2/1989 | Palmer | 204/301 |
| 4,849,102 A | 7/1989 | Latour et al. | 210/321.64 |
| 4,871,431 A | 10/1989 | Parsi | 204/182.4 |
| 4,872,958 A | 10/1989 | Suzuki et al. | 204/98 |
| 4,925,541 A | 5/1990 | Giuffrida et al. | 204/182.5 |
| 4,931,160 A | 6/1990 | Giuffrida | 204/301 |
| 4,956,071 A | 9/1990 | Giuffrida et al. | 204/301 |
| 4,964,970 A | 10/1990 | O'Hare | 204/301 |
| 4,969,983 A | 11/1990 | Parsi | 204/182.4 |
| 4,983,267 A | 1/1991 | Moeglich et al. | 204/182.4 |
| 5,007,989 A | 4/1991 | Nyberg et al. | 204/1.11 |
| 5,019,235 A | 5/1991 | Nyberg et al. | 204/282 |
| 5,026,465 A | 6/1991 | Katz et al. | 204/182.4 |
| 5,030,672 A | 7/1991 | Hann et al. | 524/109 |
| 5,066,375 A | 11/1991 | Parsi et al. | 204/182.4 |
| 5,066,402 A | 11/1991 | Anselme et al. | 210/636 |
| 5,073,268 A | 12/1991 | Saito et al. | 210/638 |
| 5,082,472 A | 1/1992 | Mallouk et al. | 55/16 |
| 5,084,148 A | 1/1992 | Kazcur et al. | 204/95 |
| 5,092,970 A | 3/1992 | Kaczur et al. | 204/98 |
| 5,106,465 A | 4/1992 | Kaczur et al. | 204/98 |
| 5,116,509 A | 5/1992 | White | 210/644 |
| 5,120,416 A | 6/1992 | Parsi et al. | 204/182.4 |
| 5,126,026 A | 6/1992 | Chlanda | 204/182.4 |
| 5,128,043 A | 7/1992 | Wildermuth | 210/695 |
| 5,154,809 A | 10/1992 | Oren et al. | 204/182.4 |
| 5,166,220 A | 11/1992 | McMahon | 521/26 |
| 5,176,828 A | 1/1993 | Proulx | 210/341 |
| 5,196,115 A | 3/1993 | Andelman | 210/198.2 |
| 5,203,976 A | 4/1993 | Parsi et al. | 204/182.4 |
| 5,211,823 A | 5/1993 | Giuffrida et al. | 204/182.4 |
| 5,223,103 A | 6/1993 | Kazcur et al. | 204/95 |
| 5,240,579 A | 8/1993 | Kedem | 204/182.4 |
| 5,254,227 A | 10/1993 | Cawlfield et al. | 204/131 |
| 5,259,936 A | 11/1993 | Ganzi | 204/131 |
| 5,292,422 A | 3/1994 | Liang et al. | 204/301 |
| 5,308,466 A | 5/1994 | Ganzi et al. | 204/151 |
| 5,308,467 A | 5/1994 | Sugo et al. | 204/301 |
| 5,316,637 A | 5/1994 | Ganzi et al. | 204/182.4 |
| 5,346,624 A | 9/1994 | Libutti et al. | 210/679 |
| 5,346,924 A | 9/1994 | Giuffrida | 521/28 |
| 5,356,849 A | 10/1994 | Matviya et al. | 502/180 |
| 5,358,640 A | 10/1994 | Zeiher et al. | 210/639 |
| 5,376,253 A | 12/1994 | Rychen et al. | 204/301 |
| 5,411,641 A | 5/1995 | Trainham, III et al. | 204/59 R |
| 5,425,858 A | 6/1995 | Farmer | 204/149 |
| 5,425,866 A | 6/1995 | Sugo et al. | 204/301 |
| 5,434,020 A | 7/1995 | Cooper | 429/210 |
| 5,444,031 A | 8/1995 | Hayden | 502/180 |
| 5,451,309 A | 9/1995 | Bell | 204/301 |
| 5,458,787 A | 10/1995 | Rosin et al. | 210/719 |
| 5,460,725 A | 10/1995 | Stringfield | 210/690 |
| 5,460,728 A | 10/1995 | Klomp et al. | 210/698 |
| 5,489,370 A | 2/1996 | Lomasney et al. | 204/627 |
| 5,503,729 A | 4/1996 | Batchelder et al. | 204/630 |
| 5,518,626 A | 5/1996 | Birbara et al. | 210/670 |
| 5,518,627 A | 5/1996 | Tomoi et al. | 210/682 |
| 5,536,387 A | 7/1996 | Hill et al. | 205/494 |
| 5,538,611 A | 7/1996 | Otowa | 204/550 |
| 5,538,655 A | 7/1996 | Fauteux et al. | 252/62.2 |
| 5,539,002 A | 7/1996 | Watanabe | 521/27 |
| 5,547,551 A | 8/1996 | Bahar et al. | 204/296 |
| 5,558,753 A | 9/1996 | Gallagher et al. | 204/632 |
| 5,580,437 A | 12/1996 | Trainham, III et al. | 205/621 |
| 5,584,981 A | 12/1996 | Turner et al. | 204/536 |
| 5,593,563 A | 1/1997 | Denoncourt et al. | 204/524 |
| 5,599,614 A | 2/1997 | Bahar et al. | 442/171 |
| 5,670,053 A | 9/1997 | Collentro et al. | 210/652 |
| 5,679,228 A | 10/1997 | Batchelder et al. | 204/524 |
| 5,679,229 A | 10/1997 | Goldstein et al. | 204/524 |
| 5,714,521 A | 2/1998 | Kedem et al. | 521/27 |
| RE35,741 E | 3/1998 | Oren et al. | 204/524 |
| 5,736,023 A | 4/1998 | Gallagher et al. | 204/524 |
| 5,759,373 A | 6/1998 | Terada et al. | 204/524 |
| 5,762,774 A | 6/1998 | Tessier | 204/524 |
| 5,766,479 A | 6/1998 | Collentro et al. | 210/639 |
| 5,788,826 A | 8/1998 | Nyberg | 204/536 |
| 5,804,055 A | 9/1998 | Coin et al. | 205/334 |
| 5,814,197 A | 9/1998 | Batchelder et al. | 204/524 |
| 5,837,124 A | 11/1998 | Su et al. | 205/746 |
| 5,858,191 A | 1/1999 | DiMascio et al. | 204/524 |
| 5,868,915 A | 2/1999 | Ganzi et al. | 204/524 |
| 5,891,328 A | 4/1999 | Goldstein | 210/321.6 |
| 5,925,240 A | 7/1999 | Wilkins et al. | 210/88 |
| 5,954,935 A | 9/1999 | Neumeister et al. | 204/632 |
| 5,961,805 A | 10/1999 | Terada et al. | 204/632 |
| 5,980,716 A | 11/1999 | Horinouchi et al. | 204/524 |
| 6,056,878 A | 5/2000 | Tessier et al. | 210/639 |
| 6,099,716 A | 8/2000 | Molter et al. | 205/687 |
| 6,149,788 A | 11/2000 | Tessier et al. | 204/524 |
| 6,187,162 B1 | 2/2001 | Mir | 204/524 |
| 6,190,528 B1 | 2/2001 | Li et al. | 204/632 |
| 6,190,558 B1 | 2/2001 | Robbins | 210/652 |
| 6,193,869 B1 | 2/2001 | Towe et al. | 204/632 |
| 6,197,174 B1 | 3/2001 | Barber et al. | 204/524 |
| 6,214,204 B1 | 4/2001 | Gadkaree et al. | 205/758 |
| 6,228,240 B1 | 5/2001 | Terada et al. | 204/632 |
| 6,235,166 B1 | 5/2001 | Towe et al. | 204/263 |
| 6,248,226 B1 | 6/2001 | Shinmei et al. | 204/632 |
| 6,254,741 B1 | 7/2001 | Stuart et al. | 204/254 |
| 6,258,278 B1 | 7/2001 | Tonelli et al. | 210/652 |
| 6,267,891 B1 | 7/2001 | Tonelli et al. | 210/652 |
| 6,284,124 B1 | 9/2001 | DiMascio et al. | 205/753 |
| 6,284,399 B1 | 9/2001 | Oko et al. | 429/19 |

| | | | | |
|---|---|---|---|---|
| 6,303,037 B1 | 10/2001 | Tamura et al. | | 210/652 |
| 6,398,965 B1 | 6/2002 | Arba et al. | | 210/652 |
| 6,402,916 B1 * | 6/2002 | Sampson et al. | | 204/524 |
| 6,402,917 B1 | 6/2002 | Emery et al. | | 204/524 |
| 6,482,304 B1 | 11/2002 | Emery et al. | | 204/524 |
| 2001/0003329 A1 | 6/2001 | Sugaya et al. | | 210/641 |

FOREIGN PATENT DOCUMENTS

| | | |
|---|---|---|
| DE | 1 201 055 | 9/1965 |
| DE | 44 18 812 | 12/1995 |
| DE | 199 42 347 | 3/2001 |
| EP | 0 503 589 | 9/1992 |
| EP | 0 621 072 | 10/1994 |
| EP | 0 680 932 | 11/1995 |
| EP | 0 870 533 | 10/1998 |
| EP | 1 068 901 | 1/2001 |
| EP | 1 075 868 | 2/2001 |
| EP | 1 101 790 | 5/2001 |
| EP | 1 106 241 | 6/2001 |
| GB | 776469 | 6/1957 |
| GB | 877239 | 9/1961 |
| GB | 880344 | 10/1961 |
| GB | 893051 A2 | 4/1962 |
| GB | 942762 | 11/1963 |
| GB | 1048026 | 11/1966 |
| GB | 1137679 | 12/1968 |
| GB | 1448533 | 9/1976 |
| JP | 47 49424 | 12/1972 |
| JP | 54-5888 | 1/1979 |
| JP | 5-271015 | 10/1993 |
| JP | 7155750 | 6/1995 |
| JP | 7-265865 | 10/1995 |
| JP | 09253643 | 9/1997 |
| JP | 2865389 B2 | 3/1999 |
| JP | 2001-79358 | 3/2001 |
| JP | 2001-79553 | 3/2001 |
| JP | 2001-104960 | 4/2001 |
| JP | 2001-113137 | 4/2001 |
| JP | 2001-113279 | 4/2001 |
| JP | 2001-113280 | 4/2001 |
| JP | 2001-121152 | 5/2001 |
| WO | WO 92/11089 | 7/1992 |
| WO | WO 95/32052 | 11/1995 |
| WO | WO 95/32791 | 12/1995 |
| WO | WO 96/22162 | 7/1996 |
| WO | WO 97/25147 | 7/1997 |
| WO | WO 97/34696 A1 | 9/1997 |
| WO | WO 97/46491 | 12/1997 |
| WO | WO 97/46492 | 12/1997 |
| WO | WO 98/11987 | 3/1998 |
| WO | WO98/20972 | 5/1998 |
| WO | WO 98/32525 A1 | 7/1998 |
| WO | WO99/39810 | 8/1999 |
| WO | WO00/30749 | 6/2000 |
| WO | WO00/64325 A2 | 11/2000 |
| WO | WO00/75082 A1 | 12/2000 |
| WO | WO01/49397 A1 | 7/2001 |

OTHER PUBLICATIONS

International Application No. PCT/US01/30053, International Search Report dated Nov. 6, 2002.

ASTM, "Standard Practice for Calculation and Adjustment of the Langelier Saturation Index for Reverse Osmosis," Designation: D3739–94 (Reapproved 1998), pp. 1–4.

Calay, J.–C. et al., "The Use of EDI to Reduce the Ammonia Concentration in Steam Generators Blowdown of PWR Nuclear Power Plants," *PowerPlant Chemistry*, vol. 2, No. 8, 2000, pp. 467–470.

Dimascio et al., "Continuous Electrodeionization: Production of High–Purity Water without Regeneration Chemicals," The Electrochemical Society *Interface*, Fall 1998, pp. 26–29.

Dimascio et al., "Electrodiaresis Polishing(An Electrochemical Deionization Process)," date unknown, pp. 164–172.

Dow Chemical, "Dowex Marathon A Ion Exchange Resin," published Dec. 1999, Product Literature reprinted from www.dow.com.

Dow Chemical, "Dowex Marathon A2 Ion Exchange Resin," published Nov. 1998, Product Literature reprinted from www.dow.com.

Dupont Product Information, "Nafion Perfluorinated Membranes," printed 11/93, 4 pages.

Dupont Product Information, "Nafion perfluorinated polymer products," Sep. 1998, 4 pages.

Dupont Product Information, "Nafion perfluorinated membranes," Bulletin 97–01, Jan. 14, 1999, 8 pages.

Farmer et al., Capacitive Deionization of $NH_4ClO_4$ Solutions with Carbon Aerogel Electrodes, *J. Appl. Electro-–Chemistry*, vol. 26, pp. 1007–1018, Jan. 1996.

FDA, "Guide to Inspections of High Purity Water Systems," printed from www.fda.gov. on Dec. 28, 2001, date unknown.

Ganzi, G.C. et al., "Electrodeionization: Theory and Practice of Continuous Electrodeionization," *Ultrapure Water*, Jul./Aug. 1997, pp. 64–69.

G.J. Gittens et al., "The Application of Electodialysis to Demineralisation," A.I.Ch.E.–I.Chem.E. Symposium Series No. 9, 1965 (London: Instn chem.Engrs), pp. 79–83.

Glueckauf, "Electro–Deionisation Through a Packed Bed," *British Chemical Engineering*, Dec. 1959, pp. 646–651.

Hobro et al., "Recycling of Chromium from Metal Finishing Waste Waters Using Electrochemical Ion Exchange (EIX)," 1994, pp. 173–183, publication and date unknown.

International Search Report PCT/US93/08745, dated Dec. 30, 1993.

International Search Report PCT/US97/17189, dated Jan. 15, 1998.

International Search Report PCT/US97/17190, dated Jan. 15, 1998.

International Search Report PCT/US00/01666, dated Jun. 13, 2000.

JHA, Anil D. et al., "CEDI: Selecting the Appropriate Configuration," reprinted from *Power Engineering*, Aug. 2000 edition.

Johnson et al., "Desalting by Means of Porous Carbon Electrodes," *Electrochemical Technology*, vol. 118, No. 3, Mar. 1971, pp. 510–517.

Kedem et al., "EDS—Sealed Cell Electrodialysis," *Desalination*, vol. 46, 1983, pp. 291–298.

Kedem et al., "Reduction of Polarization by Ion–Conduction Spacers: Theoretical Evaluation of a Model System," *Desalination*, vol. 27, 1978, pp. 143–156.

Korngold, "Electrodialysis Process Using Ion Exchange Resins Between Membranes," *Desalination*, vol. 16, 1975, pp. 225–233 No month provided.

Matejka, "Continuous Production of High–Purity Water by Electro–Deionisation," *J. Appl. Chem., Biotechnol.*, vol. 21, Apr. 1971, pp. 117–120.

Purolite Technical Bulletin, Hypersol–Macronet™ Sorbent Resins, 1995 No month provided.

V. Shaposhinik et al., "Demineralization of water by electrodialysis with ion–exchange membranes, grains and nets," *Desalination*, vol. 133, (2001), pp. 211–214 No month provided.

R. Simons, "Strong Electric Field Effects on Proton Transfer Between Membrane–Bound Amines and Water," *Nature*, vol. 280, Aug. 30, 1979, pp. 824–826.

R. Simons, "Electric Field Effects on Proton Transfer Between Ionizable Groups and Water in Ion Exchange Membranes," *Electrochimica Acta*, vol. 29, No. 2, 1984, pp. 151–158 No month provided.

R. Simons, "Water Splitting In Ion Exchange Membranes," Pergamon Press Ltd., 1985, pp. 275–282 No month provided.

R. Simons, "The Origin and Elimination of Water Splitting in Ion Exchange Membranes During Water Demineralisation By Electrodialysis," *Desalination*, vol. 28, Jan. 29, 1979, pp. 41–42.

USFilter, "H–Series Industrial CDI® Systems," product information, 1998, 4 pgs No month provied.

Walters et al., "Concentration of Radioactive Aqueous Wastes," *Industrial and Engineering Chemistry*, Jan. 1955, pp. 61–67.

Warshawsky et al., "Thermally Regenerable Polymerable Polymeric Crown Ethers, II Synthesis and Application in Electrodialysis," pp. 579–584, publication and date unknown.

Wood, Jonathan et al., "Hot Water Sanitization of Continuous Electrodeionization Systems," *Pharmaceutical Engineering*, vol. 20, No. 6, Nov./Dec. 2000, pp. 1–15.

\* cited by examiner

ELECTRODEIONIZATION APPARATUS AND METHOD

BACKGROUND OF THE INVENTION

1. Field of the Invention

The present invention relates to an electrodeionization apparatus and method, and more particularly to an electrodeionization apparatus and method that provide for improved purification of water, and in particular, for the improved removal of weakly ionizable species.

2. Description of the Related Art

Electrodeionization (EDI) is a process that removes ionized species from water using electrically active media and an electric potential to influence ion transport. The electrically active media may function to alternately collect and discharge ionizable species, or to facilitate the transport of ions continuously by ionic or electronic substitution mechanisms. EDI devices may comprise media of permanent or temporary charge, and may be operated batchwise, intermittently, continuously or in reverse polarity mode. EDI devices may be operated to cause electrochemical reactions specifically designed to achieve or enhance performance, and may comprise electrically active membranes such as semipermeable ion exchange or bipolar membranes.

In continuous electrodeionization (CEDI), which includes processes such as continuous deionization, filled cell electrodialysis, or electrodiaresis (EDR), the ionic transport properties of the electrically active media are the primary sizing parameter. These processes are described, for example, by Kollsman in U.S. Pat. No. 2,815,320; Pearson in U.S. Pat. No. 2,794,777; Kressman in U.S. Pat. No. 2,923,674; Parsi in U.S. Pat. Nos. 3,149,061 and 3,291,713; Korngold et al. in U.S. Pat. No. 3,686,089; Davis in U.S. Pat. No. 4,032,452; Tejeda in U.S. Pat. No. 3,869,376; O'Hare in U.S. Pat. No. 4,465,573; Kunz in U.S. Pat. Nos. 4,636,296 and 4,687,561; and Giuffrida et al. in U.S. Pat. No. 4,632,745. A typical CEDI device comprises alternating electroactive semipermeable, anion and cation ion-exchange membranes. The spaces between the membranes are configured to create liquid flow compartments, or cells, with inlets and outlets. A transverse DC electrical field is imposed by an external power source using electrodes at the bounds of the membranes and compartments. Often, electrolyte compartments are provided so that reaction products from the electrodes can be separated from the other flow compartments. Upon imposition of the electric field, ions in the liquid are attracted to their respective counter-electrodes. The compartments bounded by the electroactive anion membrane facing the anode and the electroactive cation membrane facing the cathode become ionically depleted, and the compartments bounded by the electroactive cation membrane facing the anode and the electroactive anion membrane facing the cathode become ionically concentrated. The volume within the ion-depleting compartments, and often within the ion-concentrating compartments, is also comprised of electrically active media. In continuous deionization devices, the media may comprise intimately mixed anion and cation exchange resins. The ion-exchange media enhances the transport of ions within the compartments and can also participate as a substrate for controlled electrochemical reactions. The configuration is similar in EDR devices, except that the media comprise separate, and sometimes alternating, layers of ion-exchange media. In these devices, each layer is substantially comprised of resins of the same polarity (either anion or cation resin) and the liquid to be deionized flows sequentially through the layers.

Electrodeionization may be more effective at removing certain types of dissolved species from a fluid. For instance, compounds that are predominantly dissociated and in ionic form are more easily transported under the influence of an electric field than are those such as boron and silica that may not be dissociated, and may exist in a predominantly non-ionized form. These non-ionized compounds may also be difficult to remove by other water purification techniques, such as reverse osmosis. Thus, a given electrodeionization device may efficiently remove fully ionized species while not removing some compounds that are not easily dissociated. The compounds that are not removed may force additional treatment in order to render the water suitable for a particular use. Some efforts have been made in this area, such as that described in Japanese Patent No. 2865389, in which it was reported that silica removal of 70% was achieved in an electrodeionization device by initially passing the water through a layer of anion exchange resin and then a layer of cation exchange resin. This level of reduction was found to be helpful in reducing the required recharging frequency of a conventional mixed bed polisher, but the ppm levels of silica that remained in the water mean that it is unusable for applications requiring sub-ppm levels of silica, without additional conventional mixed bed polishing. In addition, European Patent Application No. 1,038,837 discloses that the pH of a sub-desalination chamber may be made alkali by using a cation exchange membrane on the input side of the chamber and an anion exchange membrane on the exit side of the chamber.

As additional treatment, such as conventional mixed-bed polishing, may be costly, cumbersome and inefficient, there remains a need for an improved electrodeionization apparatus capable of removing weakly ionizable species down to sub-ppm and sub-ppb levels.

SUMMARY OF THE INVENTION

The present invention is directed to an electrodeionization apparatus and method for producing purified water. In one aspect, the invention provides an electrodeionization apparatus that comprises at least one ion-depletion compartment, a first layer of a first ion exchange material positioned in the at least one ion-depletion compartment, a second layer of a second ion exchange material positioned adjacent and downstream of the first layer, and a third layer comprising anion and cation exchange material positioned adjacent to and downstream of the second layer.

In another aspect, an electrodeionization apparatus is provided, the electrodeionization apparatus includes at least one ion depletion compartment, a first layer of ion exchange material disposed in the ion depletion compartment, the first layer comprising cation exchange resin or anion exchange resin. A second layer of ion exchange material is disposed in the ion depletion compartment and comprises cation exchange resin or anion exchange resin and is different than the first layer. At least one of the layers further comprises a dopant.

In another aspect, an electrodeionization apparatus is provided, the apparatus comprising a first cell including anion or cation exchange material, a second cell in fluid communication with the first cell, the second cell comprising anion or cation exchange material and being different than the exchange material of the first cell. A third cell is in fluid communication with the second cell, the third cell comprising a mixed ion exchange material.

In another aspect, a method is provided, the method comprising applying an electric field to an electrodeionization apparatus, the electrodeionization apparatus comprising a cation exchange layer, an anion exchange layer and a mixed ion exchange layer. A first fluid is passed through the cation exchange layer to produce a second fluid, the pH of the second fluid is adjusted by passing the second fluid through the anion exchange layer to produce a third fluid, and the third fluid is passed through the mixed ion exchange layer.

In another aspect, a method of purifying water is provided that comprises applying an electric field to an electrodeionization apparatus, the electrodeionization apparatus comprising two layers wherein the two layers are an anion exchange layer and a cation exchange layer and wherein at least one of the layers comprises a dopant. A first fluid is passed through one of the two layers to produce a second fluid, and the second fluid is passed through the other of the two layers to produce a third fluid, wherein the third fluid is at a pH that is at least one pH unit adjusted from the pH of the first fluid.

In another aspect, a water purification apparatus is provided that comprises a first reverse osmosis device, an electrodeionization apparatus in fluid communication with the first reverse osmosis device and an anion exchange layer disposed in the electrodeionization apparatus. A second reverse osmosis device is in fluid communication with the electrodeionization apparatus, the second reverse osmosis device communicating with the first reverse osmosis device via the electrodeionization apparatus, and a bypass loop provides fluid communication between the first reverse osmosis device and the second reverse osmosis device.

In another aspect, a method of purifying water is provided, the method comprising passing water through a first reverse osmosis device to produce a first fluid, raising the pH of the first fluid without adding an alkaline substance to produce a second fluid, and passing the second fluid through a second reverse osmosis device.

In another aspect, a water purification apparatus is provided, the apparatus comprising a first electrodeionization cell comprising ion exchange material, a second electrodeionization cell comprising ion exchange material, a first reverse osmosis device in fluid communication with the first electrodeionization cell and the second electrodeionization cell, and a second reverse osmosis device in fluid communication with the second electrodeionization cell.

In another aspect a method of purifying a fluid is provided, the method comprising passing a feed fluid through a first cell to adjust pH to produce a first fluid, passing the first fluid through a first reverse osmosis device to produce a second fluid, passing the second fluid through a second electrodeionization cell to adjust pH to produce a third fluid, and passing the third fluid through a second reverse osmosis device to produce a purified fluid.

In another aspect, an electrodeionization cell is provided wherein a rate of removal of a weakly ionizable species is substantially constant throughout a length of the cell.

BRIEF DESCRIPTION OF THE DRAWINGS

Preferred, non-limiting embodiments of the present invention will be described by way of example with reference to the accompanying drawings, in which.

DETAILED DESCRIPTION

Figure 1:
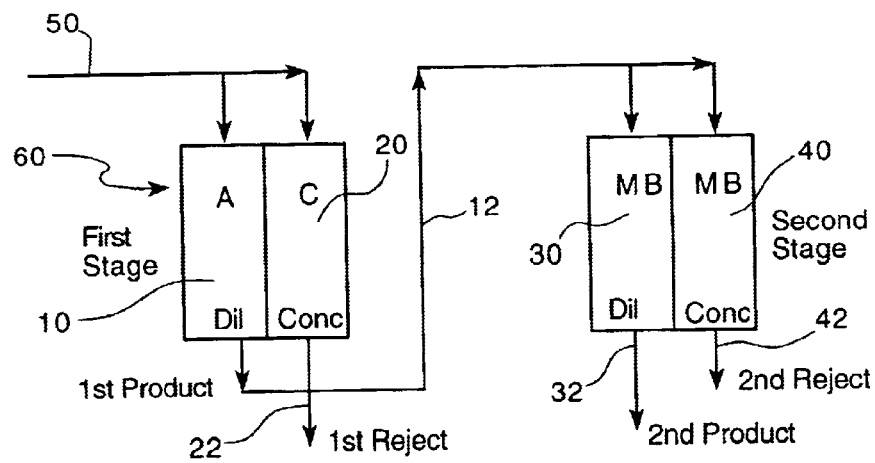
FIG. 1 is a schematic flow diagram of an embodiment of the present invention.

The present invention is directed to an electrodeionization apparatus and method that provides a high purity water having reduced levels of weakly ionizable species. The invention provides for the adjustment of the pH of water that passes through the apparatus to produce a water that contains reduced levels of one or more weakly ionizable species, as well as efficiently removing species that are more completely dissociated at commonly encountered pH levels. For instance, the concentration of anionic species such as silica or boron may be reduced in the solution by as much as 90, 99 or 99.9% or to less than 100 ppb, 10 ppb, 1 ppb or 100 ppt, by weight, making the water suitable for many applications that require low levels of weakly ionizable species.

Weakly ionizable species are those dissolved chemical species that are not mostly dissociated, or not predominantly in ionized form, at neutral pH. These species include both organic and inorganic species. These compounds may exist in solution in both ionic and non-ionic form and at any given pH, the ratio of the concentration of the ionized form to the concentration of the non-ionized form may be constant. Other factors, including temperature and the ionic strength of the solution, may also affect the amount of dissociation. Some compounds may exist in two or more states of dissociation. For example, dissolved carbon dioxide may exist in solution as $H_2CO_3$, $HCO_3$ and $CO_3^{2-}$. Generally, when the pH of the solution equals the pK of the weakly ionizable species, the concentration of the ionized form and the concentration of the non-ionized form of a given species are equal.

Compounds that dissociate into anionic species and those that dissociate into cationic species may both be removed with the present invention. Anionic species are those that form charged anions at elevated pH. These include species such as boron, silica, carbon and germanium. When in ionized form, for instance, when an adequate concentration of hydroxide ions is present, borates (pK=9.3), silicates ($pK_1$=9.47 $pK_2$=12.71) and carbonates ($pK_1$=6.3, $pK_2$=10.25) may be influenced and transported through a compartment containing anion exchange resin. This transport is facilitated by the application of an electric field. Many weakly ionizable species may be more predominantly ionized at higher pH's, e.g., pH's of 9, 10 or greater. In addition, a portion of the species may be further ionized so that the charge/mass ratio is increased.

Silica, among other weakly ionizable species, may be difficult to remove from water using conventional techniques. When silica is dissolved in water, it forms a relative unstable compound, silicic acid ($H_2SiO_3$).

$$SiO_2 + H_2O \leftrightarrows H_2SiO_3 \tag{1}$$

Silicic acid is ionized into the bisilicate ion ($HSiO_3^-$) and the hydrogen ion ($H^+$).

$$H_2SiO_3 \leftrightarrows HSiO_3^- + H^+ \quad pK=9.47 \tag{2}$$

Further ionization forms the silicate ion ($SiO_3^{-2}$) and the hydrogen ion.

$$HSiO_3^- \leftrightarrows SiO_3^{-2} + H^+ \quad pK=12.71 \tag{3}$$

As opposed to anionic species, ionizable cationic species, such as ammonia, may be ionized by reacting with $H^+$ to form positively charged species, such as ammonium ion, $NH_4^+$. These weakly ionizable cationic species may be more extensively ionized when pH is reduced, for example, below a pH such as 6 or 5. Once ionized, cationic species can be transported, under the influence of an electric field, through a layer of cation exchange resin or mixed ion exchange resin.

The purification of water by the elimination of these compounds down to low levels may be most important for particular end users of deionized water, such as, for example, semiconductor chip manufacturers. In cases such as these, it may be advantageous to achieve very low concentrations, for example, less than 1 ppm, less than 10 ppb, or less than 1 ppb, of, for example, silicon and/or boron in water.

It may be difficult to evaluate the quality of a water sample when these constituents are of concern, as species that are only slightly ionized contribute little, or not at all, to the conductivity of the water, and conductivity may often be used as an indicator of water purity. This same lack of charge may also contribute to factors that make it difficult to transport these species under the influence of an electric field, such as in an electrodeionization device.

To facilitate the transfer of weakly ionizable species, the pH of the water may be adjusted, for example, by the addition of an acid or a base. However, the introduction of an acid or base into a purified fluid may not be preferred, as these compounds may provide a possible source of contamination, may contribute to the conductivity of the water, and may also result in fluctuations in pH because of the absence, or near absence, of buffering capacity. Thus, an adjustment of pH that does not require the addition of an acid or base is preferred.

In one aspect, the present invention may provide for the adjustment of pH without significantly affecting the conductivity of the water. For example, the pH of a solution may be adjusted to greater than 7 to reduce a concentration of an anionic species, or to below 7 to reduce a concentration of a cationic species. Preferably, the pH can be adjusted by at least 1 pH unit, most preferably by more than 2 pH units and even more preferably, by more than 3 pH units. Thus, the pH of the water can be adjusted, from neutral, upward to a pH of 10 or higher and downward to a pH of about 4, or lower. Furthermore, these reductions may take place without the addition of acids or bases.

In another aspect, the invention provides for the reduction of the concentration of one or more weakly ionizable species by adjusting the pH of a fluid to alter the speciation of a weakly ionizable species and then transporting the dissociated form of the species out of the fluid. By adjusting the pH of a fluid, the dissociation constant of a chemical species may be exploited so that the ratio of the concentration of the ionized form to the concentration of the non-ionized form is increased. By splitting water and disproportionally transferring either hydrogen ions or hydroxide ions out of the depletion compartment, pH may be affected. In response to this variation in pH, some molecules of the weakly ionizable species may become ionized and therefore can be influenced by an electric field. A portion of these molecules may be transferred out of the water sample, resulting in a fluid that contains a lower concentration of the particular species.

For example, the water may be treated in an electrodeionization apparatus where it passes through a depletion compartment bounded by ion-permeable membranes, the apparatus being subjected to an electric field. As some of the ionized species are transported out of the treated fluid through an ion-selective permeable membrane, the ratio of ionized to non-ionized species may be kept relatively constant in the fluid by the subsequent dissociation of non-dissociated compounds. These newly dissociated compounds may then, in turn, be removed from the fluid. Thus, substantial removal of weakly ionizable species may occur while, at any given time, a majority of the species in solution are in non-dissociated (non-ionized) form.

For a variety of reasons, it may be preferred that the pH of the fluid be adjusted so that more of the species of concern is ionized than at neutral pH, i.e., the pH is adjusted to be between neutral and the pK of the species. It is more preferable that the pH is adjusted to, for at least a portion of the purification process, a pH that approaches the pK of the species of interest and it is most preferable that the pH reach or exceed the target pK. For removal of weakly ionizable cationic species such as ammonia, the target pH may be exceeded and may be below 7, and for weakly ionizable anion species such as silica, boron and dissolved carbon, the target pH may be exceeded and be above 7.

In one aspect, the pH of a fluid may be adjusted by passing the fluid through a layer of ion exchange material that is bounded, at least partially, by a selective ion-permeable membrane. The layer of ion exchange material may be any material capable of facilitating the transfer of ionized species from a fluid, resulting in a fluid that contains a reduced concentration of one or more ionized or ionizable species. Ion exchange materials may include both natural and man-made materials. Preferred ion exchange materials include electroactive media, such as ion exchange resins, ion exchange fibers and bonded ion exchange materials. Most preferred are ion exchange resins such as, for example, anion exchange resins, cation exchange resins, and mixtures thereof. These include Type I and type II anion exchange resins, strong or weak acid cation exchange resin, strong or weak base anion exchange resins and mixtures thereof. A resin support may be any suitable material, including acrylic and styrenic based materials. Preferably, the layer through which the fluid is passed is a substantially homogeneous layer of either anion or cation exchange material. Most preferably, if the layer is a layer of cation exchange resin, the layer also includes a dopant.

Under some conditions, for example, at the junction of cation and anion exchange material, and with adequate electric potential, water splitting may occur in an electrodeionization apparatus. The resulting concentrations of hydrogen (hydronium) and hydroxide ions may be retained in the ion-depletion compartment or may partially, or totally, be transported out of the ion-depletion compartment. For example, hydrogen ions may pass through a cation permeable membrane in response to, for example, an electric potential and/or a concentration gradient. If an unequal number of hydrogen and hydroxide ions are transported out of the ion-depletion compartment, the pH of the fluid will be adjusted either up or down, depending on the transport differential between the hydroxide and hydrogen ions. For instance, if hydrogen ions exit the compartment at a greater rate than do hydroxide ions, a greater concentration of hydroxide ions will remain, resulting in an increased pH. Conversely, if a greater number of hydroxide ions are transported out of the compartment, the pH will decrease.

A substantially homogeneous layer of ion exchange material may preferentially transport one type of ion over another. For example, anion exchange resin may preferentially transport anions, rather than cations, if an appropriate membrane and electric potential are used. If anions present in a water sample are transported out of a compartment through an anion-permeable membrane and hydrogen ions are transported out of the same compartment through a cation-permeable membrane, electrical balance suggests that the hydroxide ion concentration in the compartment will become greater than the hydrogen ion concentration, and a rise in pH will occur. Alternatively, if the compartment contains predominantly cation exchange resin, cations such as sodium or calcium may be transported through the membrane concurrently with the transport of hydroxide ions through an opposing membrane. Thus, a greater number of hydrogen ions will be retained in the compartment compared to hydroxide ions, and the pH of the fluid within the compartment will decrease.

Because pH adjustment by this method may be a result of water splitting and the unequal transport of hydrogen and hydroxide ions from the water, rather than due to the addition of a basic or acidic substance, the pH of the water may be adjusted while maintaining or even decreasing, the conductivity of the water. Thus, a water sample may be adjusted to a pH that promotes the ionization of a weakly ionizable species without the introduction of additional compounds that may hinder water quality and cause fluctuations in pH.

In one embodiment, weakly ionizable anionic species such as silica, boron, ammonia and carbonate may be removed from water by passing the water through an ion-depletion compartment containing a layer of anion exchange material. This may allow for the production of water, using an electrodeionization apparatus, containing very low levels of these compounds, thus allowing for the use of the water in systems that require low concentrations of these compounds. This may be achieved without the use of a conventional polishing bed that might require frequent recharging or replacement of ion exchange media.

To facilitate the removal of weakly ionizable anions, the fluid being treated is preferably passed through a layer of anion exchange resin disposed in a cell that is bounded by an anion permeable membrane on a side facing an anode and by a cation permeable membrane on a side facing a cathode. Alternatively, the cell may be bounded by two anion permeable membranes or two cation permeable membranes. Impermeable or universally permeable membranes may also be used. There may be an ion-concentrating chamber on the opposite side of either membrane and the ion-concentrating compartment may be an electrode compartment or a concentrating compartment, distinct from an electrode compartment. This concentrating compartment may contain inert material, ion exchange material, a mixture of ion exchange material or may be empty except for a fluid concentrating stream or reservoir.

Preferably, before the fluid is passed through an anion exchange layer, it is first passed through a cation exchange layer. Although the pH of the fluid may be lowered upon passage through a cation exchange layer, it is believed that downstream removal of weakly ionizable anions is improved because the fluid may be conditioned in the cation exchange layer by, for example, removing hardness components such as calcium and magnesium as well as by lowering the overall conductivity and dissolved solids loading of the fluid. By removing some of the compounds that contribute to hardness, such as calcium, as well as compounds that may form undissolved hydroxides, such as magnesium and iron, the potential for scaling downstream in the anion resin is reduced. This may be of particular importance when the pH of the fluid is raised to promote dissociation, because scaling and metal hydroxide precipitation are generally more pronounced at an elevated pH. In addition, by first passing the water sample through a layer of cation exchange resin, the pH may be lowered prior to the water contacting the anion exchange resin. This may result in a lower pH after passing through the anion exchange material as well, providing for greater solubility of calcium and other scalants, while still providing for effective removal of weakly ionizable anion species.

Another problem that may occur in electrodeionization systems is scaling in the concentration compartment of a device if calcium or other scalants are transferred into the compartment, and the fluid in the compartment is at neutral or alkaline pH. However, if the cation exchange layer and the anion exchange layer share a common concentrating compartment, or if the respective concentrating compartments are in series, hydrogen ions may be transferred into the concentrating compartment from the portion of the depletion compartment containing the anion exchange resin. This will lower the pH in the concentrating compartment (while raising the pH in the adjacent depletion compartment), thus helping to keep precipitating compounds in solution in the concentrating compartment. It may be preferable to keep the volume of a leading layer of cation exchange material to a minimum to prevent the transfer of excessive amounts of calcium to the concentration compartment prior to a downstream reduction in pH.

For the removal of weakly ionizable cationic species, a fluid may be passed through a cation exchange material that may help to lower the pH of the fluid. Preferably, the pH is adjusted so that it approaches the pK of the species being removed, and most preferably, the pH is adjusted to be equal to or beyond the pK of the species. For example, the pK of ammonium ion is about 9.25 and more efficient removal may be obtained when the pH is reduced to below neutral. It is preferred that the pH be lowered to about 6 and more preferably to below about 5. At these lower pH's, a greater percentage of the ammonia in solution will be ionized and thus removal of ammonia via an electrodeionization technique may be facilitated. Removal efficiency may be improved by preceding passage of the water through the cation exchange material with passage through a layer of anion exchange material. This may condition the water by removing a portion of the anions that may then provide for more efficient transfer of hydroxide ions from the water when it passes through the cation exchange layer.

Whether anionic compounds, cationic compounds, or both, are being removed from water, the process may be improved by either pre-treating or post-treating the water by passing it through a layer of mixed ion exchange material. The mixed ion exchange material may be used to polish the water to remove traces of ions, including both weakly ionizable species and those that are predominantly in ionized form. Preferably, the mixed ion exchange material is in an electrodeionization device and most preferably, the water is passed through the electrodeionization device after it passes through a series of homogeneous or doped anion/cation or cation/anion exchange layers. The use of a CEDI mixed bed is preferred over a conventional rechargeable polisher because, for example, of lower operating costs, no reagent requirement and fewer interruptions in service. In addition, the removal efficiency that may be achieved with certain embodiments of the invention makes the use of a conventional polisher unnecessary.

The pH of the fluid being treated may not be adjusted instantaneously to a target pH upon contact with a layer of anion exchange material or a layer of cation exchange material. Rather, the pH may be gradually adjusted as the water passes through the layer and as ions (either hydroxide or hydrogen ions) are removed from the water. Therefore, the pH of the water may approach the target pH when it is in contact with only a small portion, generally a latter portion, of the layer. The adjusted pH may be maintained, at least temporarily, as the water passes from a substantially homogeneous ion exchange material into a subsequent mixed ion exchange material, in which case removal of weakly ionizable species may continue, facilitated by the adjusted pH.

Rather than allowing the pH to drift back toward neutral as the fluid passes through a mixed bed, it may be preferred to maintain the treated water at or around a target pH for an extended time as the water passes through the system. This may enable the rate of removal to be substantially constant throughout the layer, or an entire cell, as the fluid passes through the layer. This may be accomplished, for example, by providing a layer of ion exchange material that includes a mixture of ion exchange materials chosen to provide for retention of a stable, non-neutral pH. In this manner, a pH of around 8, 9, 10, 6, 5 or 4 may be substantially maintained by passing the fluid through such a layer that may fill, for example, ¼, ½ or an entire cell. For instance, if an elevated pH is desired, a mixture of cation and anion exchange material that favors anion exchange material (on a molar basis) may be used. Conversely, a reduced pH may be maintained by passing the fluid through a mixture that uses a majority (on a molar basis) of cation exchange resin. These layers may also be interlayed between layers of anion, cation or mixed ion exchange materials. Some molar ratios of anion/cation exchange materials that may be useful to maintain elevated pH's are 1.5:1, 2:1, 3:1, 4:1 and 10:1. The inverse of these ratios may be used to maintain a pH below neutral that may be preferred when weakly ionizable cationic species are to be removed. Preferably, the ion exchange materials are ion exchange resins. In this manner a small section of a cell where peak removal may occur can be expanded to include a more extensive area, such as the entire length of a cell.

A number of variables may be used to adjust a pH of a water sample to a desired range. Among the variables that may affect pH adjustment are electric current, type of ion exchange material, type of membrane material, the total surface area of ion exchange material, the amount of ion exchange material, contact time of the water with the ion exchange material and pre-treatment of the water. Contact time of the water with the ion exchange material may be controlled in a number of ways, including flow velocity through the layer, the volume of the layer, and the surface density of ion exchange units on the ion exchange material that is used. For instance, the pH of a fluid may be raised to a greater degree, for example, by slowing down the flow through an anion exchange material or by increasing the volume of the ion exchange material through which the water flows.

Improved results may be achieved by using alternating layers of anion, cation and mixed ion exchange material, and the volumetric and surface area ratios of each layer in relation to another may be varied. For instance, to remove weakly ionizable anionic species from a water, a layer of substantially homogeneous anion exchange material may be preceded by a layer of substantially homogeneous cation exchange material. In this case, it may be preferred that a greater amount of anion exchange material than cation exchange material be used. More preferred is a volume of anion exchange material that is more than twice the volume of cation exchange material and most preferred is a volume of anion exchange material that is equal to or greater than three times the volume of the cation exchange material. The inverse may be preferred for the removal of weakly ionizable cationic species.

A variety of configurations of different types of ion exchange materials may be used with the invention, and any configuration may be repeated within a single cell, module, series of cells or series of modules.

A module is defined herein as a portion of an electrodeionization device containing at least one concentrating and one depleting compartment that are positioned between a single pair of electrodes. A module may contain one or more cells which may function as depleting compartments, concentrating compartments, electrode compartments or some combination thereof.

A cell is defined herein as a compartment within a module that is bounded by at least two membranes and through which fluid may pass continuously in a single direction, generally vertically and parallel to the membranes. Cells may or may not contain ion exchange material and a plurality of cells may be arranged in series or in parallel within a module. A cell may contain any configuration of ion exchange material, including, for example, homogeneous ion exchange material, layered ion exchange material, mixed ion exchange material, doped ion exchange material and inert material. Water may be passed through ion exchange layers in various orders. Several layer patterns of ion exchange material that may be useful with different embodiments are as follows:

anion/cation
cation/anion
anion/cation/mixed
cation/anion/mixed
mixed/cation/anion
mixed/anion/cation Of course, any of these configurations may be repeated one or more times, either in whole or in part. In addition, the configurations may be within a single module or, preferably, may be split into two or more modules or separated by inert or electroactive screens or by other inert or electroactive materials such as glass, carbon or polymeric materials. It may be preferred that layers within the same stack be selectively doped so that, for example, current distribution within the stack can be balanced.

Figure 12:
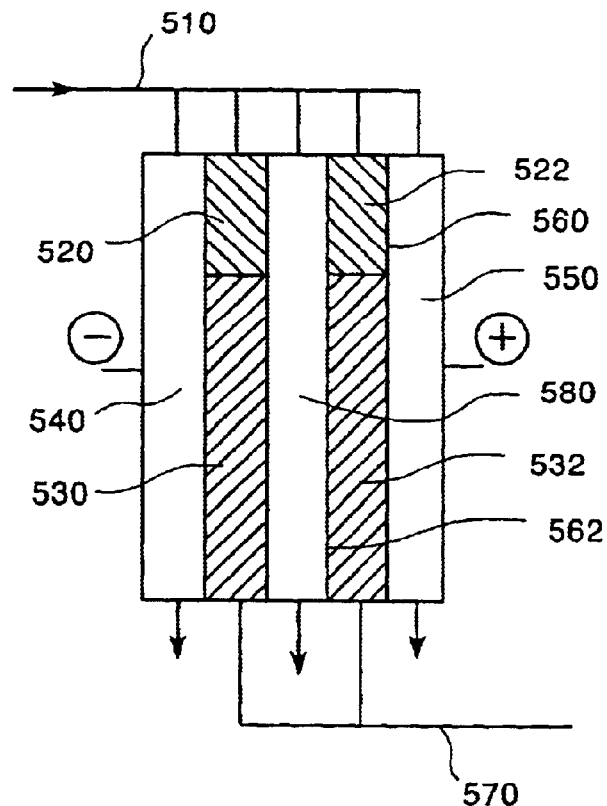
FIG. 12 is a schematic cross-sectional view of a module of an embodiment of the present invention.

A module may include one or more depletion cells that may operate in series or parallel. Each depletion cell may contain a single layer of ion exchange material or may contain multiple layers or patterns. The ion exchange material may be, for example, beads, fibers, woven materials, non-woven material and bound resin beads. One embodiment of a module is illustrated in cross-section in FIG. 12 and shows two equivalent depletion cells, each containing a layer of cation exchange material, 520 and 522, and a layer of anion exchange material, 530 and 532. Each depletion cell is bounded by an anion permeable membrane 560 and a cation permeable membrane 562. Concentration compartment 580 lies between the two depletion cells (or compartments) and may or may not contain ion exchange material. Water may be fed to the device through distributor 510 where the flow is split to feed the depletion compartments, electrode compartments 540 and 550, and concentration compartment 560. As electrode compartments 540 and 550 may also collect ionic material from the depletion compartments, they too may be considered to be concentrating compartments.

In operation, an electric potential is applied between the cathode and the anode and current passes through electrolytic material that may be stationary or mobile in each of the electrode compartments 540 and 550. Current also passes through the depletion compartments and concentrating compartment 560, providing for water splitting and for transport of ions. Current may pass, for example, continually in one direction, or a reverse polarity system may be employed wherein the polarity of the electrodes may be periodically reversed to aid in, for example, reduction of scaling within the various compartments. Purified fluid may be collected at conduit 570.

Figure 13:
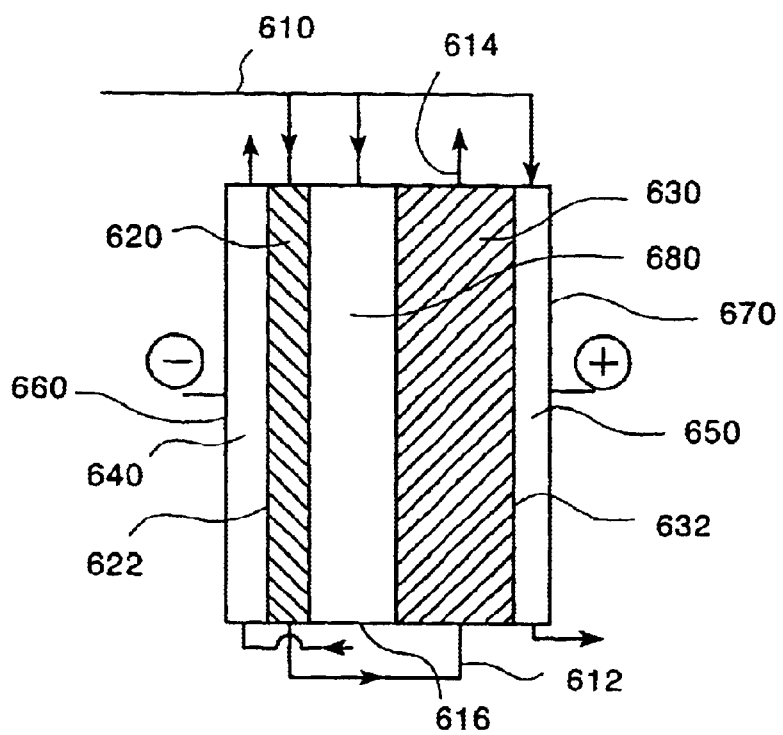
FIG. 13 is a schematic cross-sectional view of a module of another embodiment of the present invention.

FIG. 13 illustrates schematically another embodiment of a module of the invention in which the module may contain multiple depletion compartments, 620 and 630, each of which may contain a different type of ion exchange material. In FIG. 13, depletion compartment 620 is filled with homogeneous cation exchange resin and depletion compartment 630 is filled with a mixture of Type I and Type II anion exchange resins. Water is fed to the module through conduit 610 where the flow is divided between concentrating compartment 680, depletion compartment 620 and anode compartment 650. As an electric potential is applied between cathode 660 and anode 670, water flows through depletion compartment 620 and cations, including divalent cations such as calcium, are transported through cation permeable membrane 622 into cathode compartment 640 (also a concentrating compartment). As the water passes through the layer of cation exchange resin, the pH of the water may be adjusted lower due to unequal transfer of hydrogen ions and hydroxide ions from the cell. The treated water, now reduced in hardness and in pH, passes through conduit 612 and into depletion compartment 630 that contains a specialized electroactive media of Type I and II anion exchange resins in a volume about three times that of the cation exchange layer. As the water passes through this compartment, the pH is adjusted higher, and weakly ionizable species may be dissociated and passed through anion permeable membrane 632 into anode (concentrating) compartment 650. Purified water exiting at conduit 614 may be further treated, for example, by passing it through another electrodeionization device that may include a mixed ion exchange material.

Water passing through concentration compartment 680, which may contain ion exchange material, may have a pH below neutral due to a greater influx of hydrogen ions than hydroxide ions. This low pH water then passes through conduit 616 and feeds cathode compartment 640. The reduced pH of this fluid may help prevent scaling that would otherwise occur in cathode compartment 640 due to the influx of calcium and other precipitating ions through cation permeable membrane 622.

Using such a configuration, it may be possible to vary the bed volume of each ion exchange resin, without requiring layering within a cell.

In some embodiments, particularly where separate layers are disposed in a single cell, it may be preferable that one or more of the layers is doped. By adding a dopant to a layer of homogeneous ion exchange resin, usually cation exchange resin, the conductivity of the layer may be balanced with that of another layer, or layers, in the same cell. In this manner, improved current distribution through the module may be achieved. The dopant may be either an inert or an electroactive material. For example, the dopant may be an anion exchange resin that has been added to a layer of cation exchange resin in order to decrease the conductivity of the layer.

In FIGS. 4a–4f, varying schematic, cross-sectional views of an ion-depleting compartment 100 according to the present invention are shown. According to the embodiments, alternating layers, or beds, of ion exchange resin material are positioned in the ion-depleting compartment 100 in a central space formed between an anion-permeable membrane 126 and a cation-permeable membrane 124.

Figure 4A:
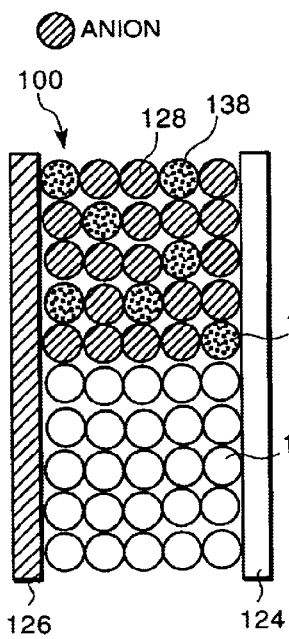
FIGS. 4a–4f are schematic, enlarged, cross-sectional views of layer configurations that may be applied in different embodiments of the invention.
Figure 4B:
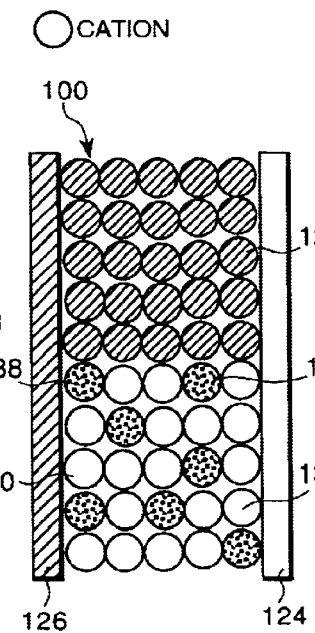
Figure 4C:
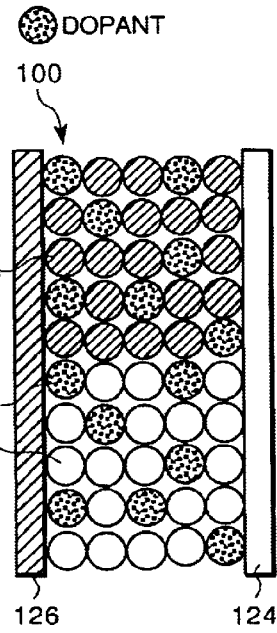

In one aspect of the invention illustrated in FIGS. 4a–4c, the first, or topmost layer, is preferably an anion exchange resin material 128, and the second layer is preferably a cation exchange resin material 130. In one embodiment illustrated in FIG. 4A, the first layer of anion exchange resin material 128 is preferably doped with a dopant material 138, while the second layer of cation exchange resin beads 130 is preferably undoped. Conversely, in another embodiment illustrated in FIG. 4b, the first layer of anion exchange resin material 128 is preferably undoped, while the second layer of cation exchange resin material 130 is preferably doped with a dopant material 138. In another embodiment illustrated in FIG. 4c, both the first anion exchange resin material layer 128 and the second cation exchange resin material layer 130 are preferably doped with dopant material 138.

Figure 4D:
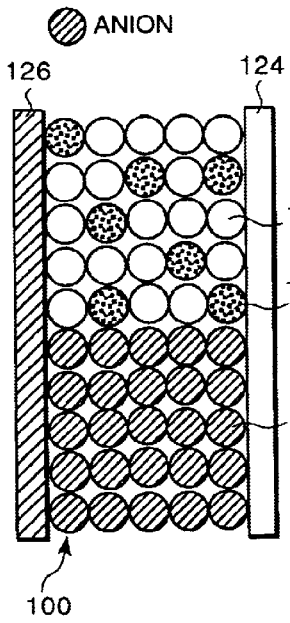
Figure 4E:
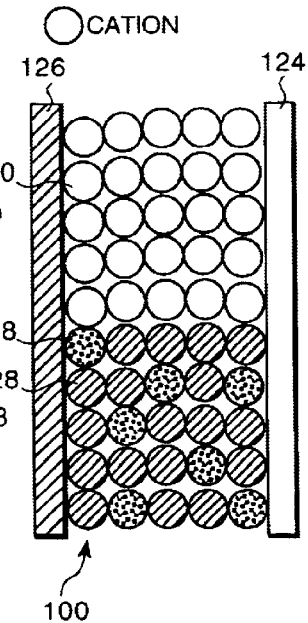
Figure 4F:
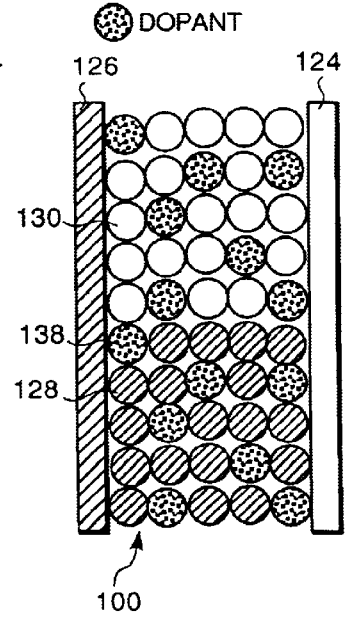

FIGS. 4d–4f illustrate another aspect of the invention, in which the first, or topmost layer in the ion-depleting compartment is a cation exchange resin material 130, and the second layer is an anion exchange resin material 128. In one embodiment illustrated in FIG. 4d, the first cation exchange resin material layer 130 is preferably doped with a dopant material 138, while the second anion resin material layer 128 is preferably undoped. Conversely, in another embodiment illustrated in FIG. 4e, the first cation exchange resin material layer 130 is preferably undoped, while the second anion exchange resin material 128 is preferably doped with a dopant material 138. In another embodiment illustrated in FIG. 4f, both the first cation exchange resin material layer 130 and the second anion exchange resin material layer 128 are preferably doped with dopant material 138. When either, or both, of the alternating layers are doped, they may be doped with the same or a different dopant material.

Preferably, when either, or both, of the alternating layers of ion exchange resin material 128 and 130 are doped, they are doped with less than about 50 percent, more preferably less than about 40 percent, more preferably less than about 30 percent, more preferably less than about 20 percent, and more preferably still less than about 10 percent, of a dopant material, by volume of the layer to be doped. As noted above, the dopant material may be an inert or an electroactive media, preferably anion or cation exchange resin beads. Some examples of dopant materials included strong and weak cation exchange resin, type I and type II anion exchange resin, inert material such as glass beads, or an electrically conductive non-ion exchange material such as, for example, carbon or conductive polymer beads.

In one embodiment, the electrodeionization apparatus may include any number of different modules in fluid communication with each other, and the possible combinations may include, for example, the configurations illustrated in FIGS. 5–9. Although each of these schematic figures only shows modules or depletion compartments, it is understood that each depletion compartment may be accompanied by one or more adjacent concentration compartments.

Figure 5:
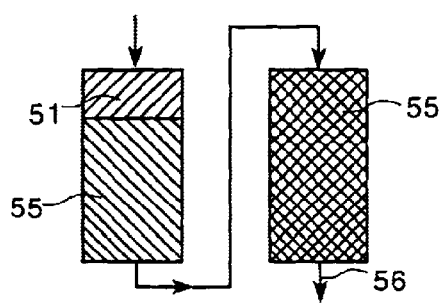
FIG. 5 is a schematic flow diagram of one embodiment of the invention.

FIG. 5 illustrates an embodiment where feed water is first passed through a first cell including cation exchange material 51 and anion exchange material 53. The water is then passed to a second cell where it passes through mixed ion exchange material 55. Purified water is then received through outlet 56.

Figure 6:
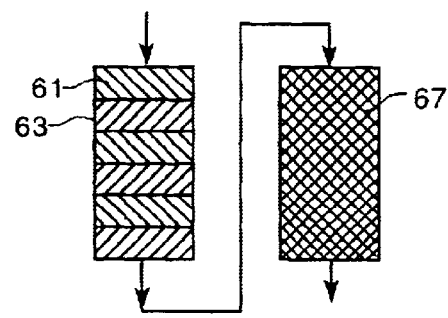
FIG. 6 is a schematic flow diagram of another embodiment of the invention.

FIG. 6 illustrates an embodiment in which different ion exchange materials are repeatedly layered in a single module. For instance, the first module may include layers that consist of an anion layer 61 followed by a cation layer 63. This pattern may then be repeated any number of times, for example, three times, as illustrated in FIG. 6. The depth of each layer may vary and need not be consistent throughout the cell. The water is then passed to a second cell where it passes through mixed ion exchange material 67.

Figure 7:
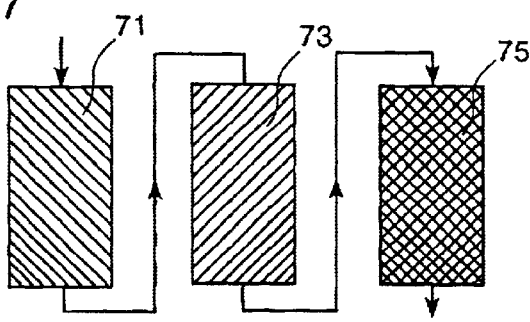
FIG. 7 is a schematic flow diagram of another embodiment of the invention.

FIG. 7 illustrates an embodiment wherein each cell may contain a single layer of ion exchange material, be it anion, cation, doped anion, doped cation or mixed material. Water is first passed through anion exchange layer 71, next through cation exchange layer 73 and finally through mixed ion exchange layer 75. A module may include a series of cells that contain identical or similar ion exchange material. By dedicating an entire module to a single type of ion exchange material, the process may be efficiently controlled both electrically and chemically, as each module can have consistent electrical and chemical characteristics throughout. For example, voltage and current may be independently controlled to a module to optimize the current passing through a cell, without affecting the current passing through cells in other modules. Any number of different modules may be electrically controlled independently of the other modules. For example, by placing different types of cells in different modules, for instance, a current applied to a first cell may be independently controllable from a current applied to a second cell.

Figure 8:
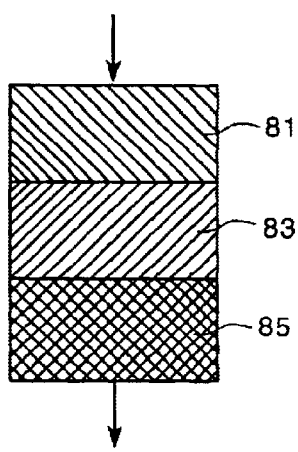
FIG. 8 is a schematic flow diagram of another embodiment of the invention.

FIG. 8 illustrates another embodiment in which three different types of ion exchange layers may be included in a single cell. Cation exchange layer 81 may be followed by anion exchange layer 83 which is in turn followed by mixed ion exchange layer 85. It may be preferred that one or more of the layers in this configuration is doped so that advantages, such as balancing the resistance between layers, may be obtained.

Figure 9:
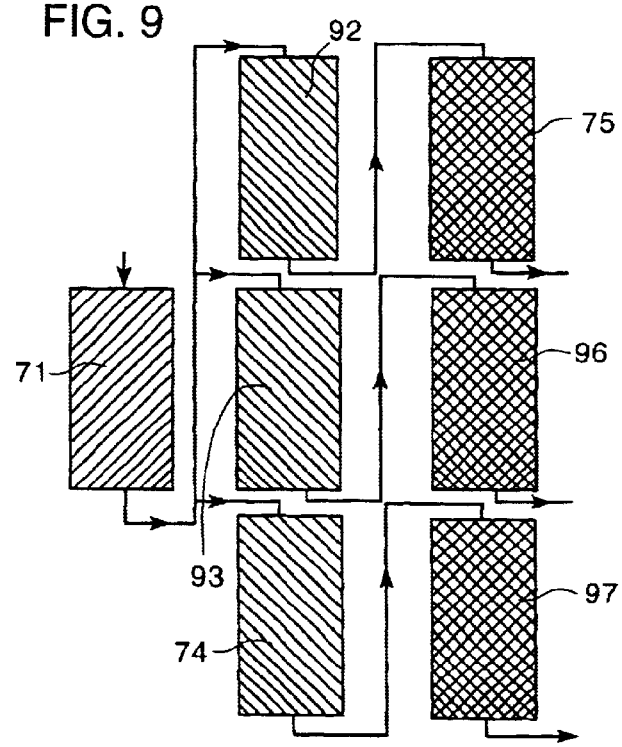
FIG. 9 is a schematic flow diagram of another embodiment of the invention.

FIG. 9 illustrates an embodiment that may provide both high output and precise control of individual layers. If it is desirable to first pass the water being treated through a layer of cation exchange material 91 and then through a larger volume of anion exchange material, the anion exchange material may be split into multiple modules 92, 93 and 94, within a stage, providing for individual control of each of these modules. For example, if twice the volume of anion exchange material is preferred, then two dedicated anion exchange modules may be used, etc. This may allow for the ease of use associated with a modular system that can be tailored for specific requirements simply by adding or subtracting pre-made modules. In FIG. 9, each anion exchange material module 92, 93 and 94 is shown feeding one of three independent mixed ion exchange modules 95, 96 and 97 respectively. Feed from each module of the second stage may also flow to a common conduit before being re-divided to feed stage 3. There need not be a one-to-one correspondence between modules, and anion exchange material modules 92, 93 and 94 may feed a fewer or greater number of mixed ion exchange material electrodeionization devices.

It is to be understood that the configurations shown herein are illustrative only and that, for example, anion exchange material may be switched with cation exchange material or mixed ion exchange material. Furthermore, the ion exchange materials may be contained in any number of different cells within a module and cells need not be of the same size or contain the same material, and the devices shown in FIGS. 5–9 may represent, for example, cells, modules or a group of identical cells within a module. In addition, the systems illustrated herein may be used in any type of electrodeionization system, for example, a continuous electrodeionization system or a reverse polarity configuration.

It may be preferable, in order to increase the range of pH adjustment, to increase the amount of water splitting that occurs in a depletion chamber. This may be accomplished in a number of ways, including, for example, the use of specialized electroactive media, increased cation/anion resin contact, and increased electric potential. Thus, in one embodiment, a method of amplifying the amount of pH adjustment available is to increase the amount of contact between anion and cation exchange materials. The amount of contact may be increased by increasing the surface area of the membrane that is in contact with oppositely charged resin or by increasing the layering frequency to result in a greater number of layer interfaces. For example, instead of single layers of cation and anion resin having depths of 10 cm, two alternating layers of each type may be used, each 5 cm in depth, to effectively double the amount of contact between the two resin types. If unequal amounts of different ion exchange materials are to be used in the same depletion compartment, then the alternating layers may be of different thicknesses. For instance, the cation exchange layers might be 1 cm deep and the anion exchange layers might be 3 cm deep when a volumetric ratio of 1:3 is preferred. It may also be preferred to increase the electric potential between the electrodes so that an adequate water splitting potential exists at the resin interface. This may be accomplished, for example, by increasing the voltage or the electrical resistance in the depletion compartment.

EXAMPLES

Example 1

An experiment using a two-stage electrodeionization device was run to determine the quality of the water to be produced by passing water first through a module comprising anion exchange material and then through a module comprising mixed ion exchange material. The apparatus is shown schematically in FIG. 1. A feed stream 50 from a reverse osmosis device (not shown) was split to feed an ion-depletion compartment 10 and ion-concentrating compartment 20, both compartments being in the first module 60. Ion-depletion compartment 10 was filled with a specialized electroactive media consisting of DOWEX™ MARATHON™ A anion exchange resin (a trademark of Dow Chemical Corporation) and AMBERJET™ 4600 Type II anion resin (a trademark of Rohm and Haas Corporation, Philadelphia, Pa). The adjoining concentrating compartment was filled with a single layer of MARATHON™ C cation exchange resin, available from Dow. The depletion compartment was bounded by a cation permeable membrane on the cathode side and an anion permeable membrane on the anode side. A flow rate of 8.4 L/min. was fed to the depletion compartment and a flow of 0.8 L/min. was fed to the concentrating compartment. A flat platinum anode and a flat stainless steel cathode were used.

The product from the first stage was fed through conduit 12 to a second stage having a depletion compartment 30 and a concentrating compartment 40. Both of these compartments contained layers of mixed ion exchange resin. The resins used were 50/50 vol/vol MARATHON™ A anion resin and MARATHON™ C cation resin and the layer was 35 cm in depth. The feed was divided so that the flow to the depletion compartment was about 7.6 liters per minute (L/min) and the flow to the concentrating compartment was 0.8 L/min.

A DC voltage of 123–273 volts was applied to the first module, providing a current of 3.51–5.77 amps during operation of the apparatus. A DC voltage of 8.6–9.8 volts was applied to the second module, providing a current of 1.94–2.51 amps through the module.

Table 1 provides data for a variety of parameters and properties including conductivity, pH, and silica content of the various streams. Although the resistivity of the product from the first stage was 0.15 MΩ-cm, the silicate content of the RO feed was reduced from 231.5 ppb to non-detectable (less than 1.0 ppb) levels. After passing through the second stage, the resistivity was increased to 18.2 MΩ-cm and the silicate content remained below the detection limit of 1.0 ppb. This demonstrates the effectiveness of one embodiment of the invention in removing silica, a weakly ionizable species, from a water sample.

TABLE 1

|  | First Stage | Second Stage |
| --- | --- | --- |
| Feed Conductivity (μS/cm) | 5.98 | 6.63 |
| Feed temperature (° C.) | 25.8 | 25.9 |
| Feed pH | 6.47 | 9.0 |
| Feed $CO_2$ (ppm) | 2.5 | <1.25 |
| FCE (μS/cm) | 13.08 | 6.63 |
| Voltage (V) | 136 | 8.6 |
| Current (A) | 3.51 | 1.94 |
| Resistance (Ω) | 38.7 | 4.43 |
| Current Efficiency (%) | 9.2 | 8.5 |
| Product Resistivity (MΩ-cm) | 0.15 | 18.2 |
| Product pH | 9.0 | 6.39 |
| Product Flow rate (gpm) | 5.0 | 1.9 |
| Product pressure drop (psi) | 33.9 | 15.4 |
| Reject Conductivity (μS/cm) | 39.2 | 65.5 |
| Reject pH | 5.21 | 10.2 |
| Reject Flow rate (gpm) | 0.55 | 0.22 |
| Reject pressure drop (psi) | 5.7 | 2.4 |
| Feed $SiO_2$ | 231.5 | <1.0 |
| Product $SiO_2$ (ppb) | <1.0 | <1.0 |
| Reject $SiO_2$ (ppb) | 2406 | N/A |

Example 2

Figure 2:
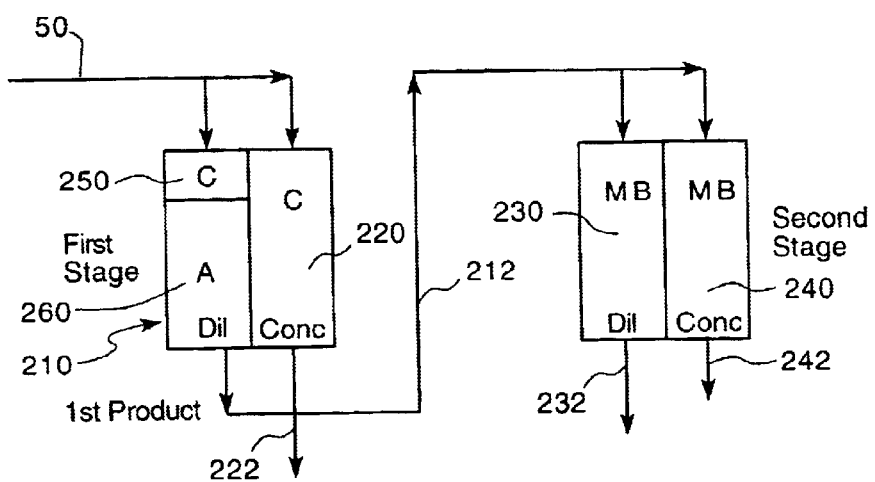
FIG. 2 is a schematic flow diagram of another embodiment of the present invention.
Figure 3:
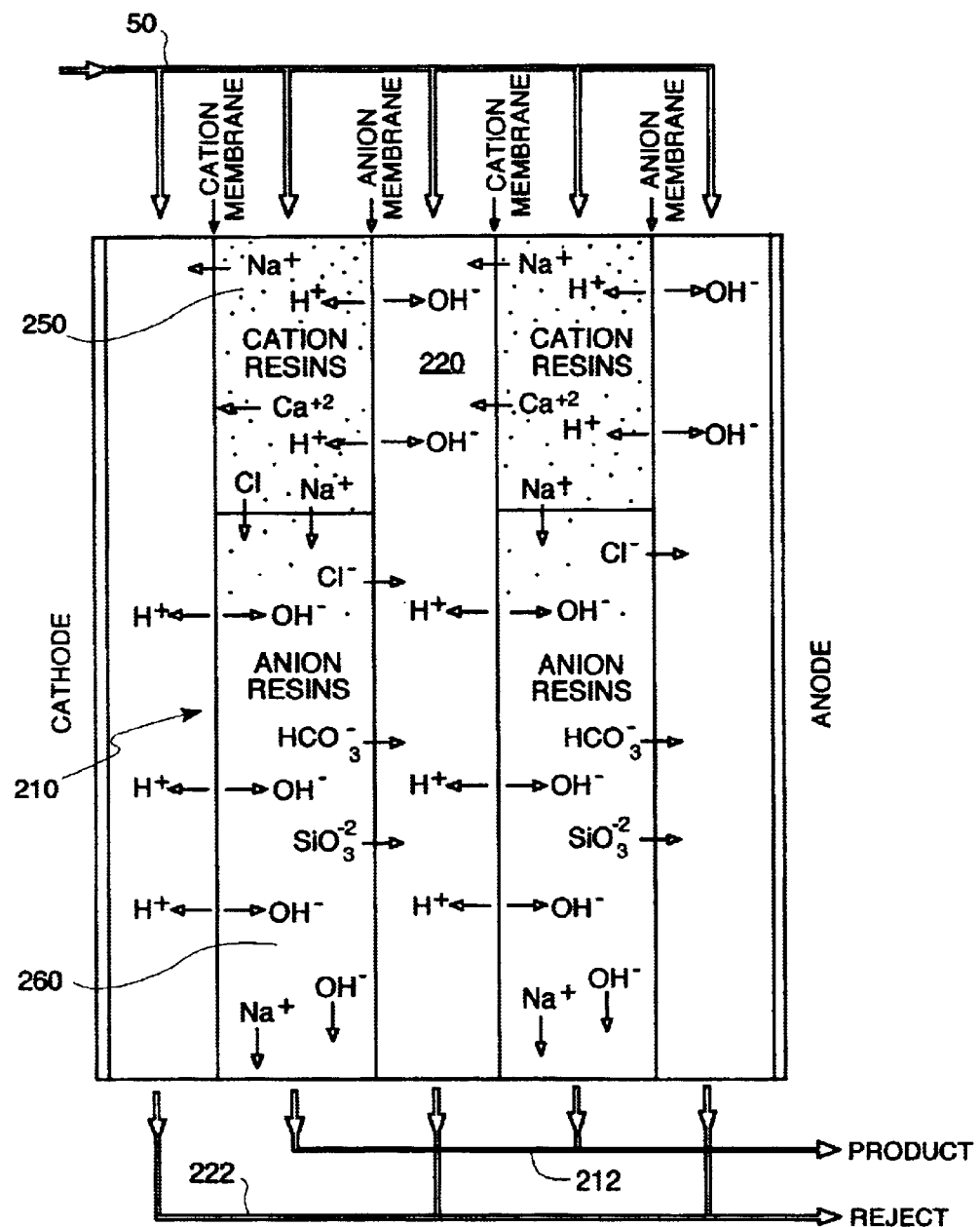
FIG. 3 is a schematic cross-sectional view of an embodiment of a module of the present invention.

A second experiment was designed using an apparatus similar to that of Example 1 except that a portion of the anion exchange resin in the ion-depleting compartment of the first module was replaced with cation exchange material 250, as illustrated in FIGS. 2 and 3. The cation exchange material 250 used in the first module ion-depletion compartment 210 was MARATHON™ C cation exchange resin, available from Dow. The anion exchange material 260 was identical to that used in Example 1. The volumetric ratio of anion/cation resin was about 3:1 and the layer of cation resin was in direct contact with the layer of anion resin. Ion-concentration compartment 220 was filled with cation exchange material. Both the second module depletion compartment 230 and the second module concentration compartment 240 were filled with a layer of 50/50 vol/vol mixed ion exchange resin. The apparatus was operated under conditions identical to those used in Example 1, with the water first being passed through the layer of cation exchange material and then through the layer of anion exchange material. The water from the depletion compartment was then passed through conduit 212, the flow of which was split to feed the second stage depletion and concentrating compartments. First stage concentrate was rejected via conduit 222. Final product was received from second stage conduit 232 and second stage reject was passed through conduit 242. The data derived from the experiment are provided in Table 2.

TABLE 2

|  | First Stage | Second Stage |
| --- | --- | --- |
| Feed Conductivity (μS/cm) | 6.41 | 0.99 |
| Feed temperature (° C.) | 19.1 | 19.1 |
| Feed pH | 6.3 | 7.8 |
| Feed $CO_2$ (ppm) | 2.5 | <1.25 |
| FCE (μS/cm) | 13.4 | <4.18 |
| Voltage (V) | 63.6 | 8.1 |
| Current (A) | 3.52 | 1.42 |
| Resistance (Ω) | 18.10 | 5.7 |
| Current Efficiency (%) | 9.1 | 6.3 |
| Product Resistivity (MΩ-cm) | 1.01 | 18.2 |
| Product pH | 7.8 | 6.5 |
| Product Flow rate (gpm) | 1.9 | 1.72 |
| Product pressure drop (psi) | 22.5 | 12.6 |
| Reject Conductivity (μS/cm) | 68.6 | 31.6 |
| Reject pH | 6.45 | 9.9 |
| Reject Flow rate (gpm) | 0.21 | 0.22 |
| Reject pressure drop (psi) | 3.7 | 3.7 |
| Feed $SiO_2$ | 180 | <1 |
| Product $SiO_2$ (ppb) | <1 | <1 |
| Reject $SiO_2$ (ppb) | 1980 | N/A |

When these results are compared to the results of Example 1, one notable property that is different is the pH of the first stage product. This may be explained by the use of a layer of cation resin upstream of the anion resin in the first stage. It is also significant that the product resistivity of the first stage product has changed from a value of 0.15 MΩ-cm in Example 1 to a value of 1.01 MΩ-cm in Example 2. Example 2 did not use an increased amount of ion exchange material, only the substitution of cation exchange material for a portion of the anion exchange material in Example 1. The preliminary removal of some cationic species may result in reduced ionic loading that in turn may promote water splitting to improve the adjustment to pH. This may lead to greater dissociation of weakly ionizable species in a shorter anion exchange layer.

Example 3

An additional experiment was run using the apparatus of Example 2 to compare results with those obtained using a conventional mixed bed polisher. The water supply was a low temperature (7° C.) RO feed and 16.25 ppm of $CO_2$ were added to the feed to simulate a high level of dissolved carbon dioxide. In test 3a, the apparatus was identical to that described above in Example 2, and the test 3b used the same feed and then passed the water through a conventional, rechargeable, mixed bed polisher that was not part of an electrodeionization device. Results from both tests are supplied in Table 3 below, with the results from test 3a being reported in the first column and results from test 3b being reported in the second column. The results, particularly those for weakly ionizable species such as silica, indicate that these impurities may be reduced to levels using electrodeionization that approach or equal the levels obtained using a conventional polisher. If an electrodeionization device can be substituted for a conventional polisher without a significant decrease in water quality, the savings available to the user may be significant.

TABLE 3

| Feed temperature | 7° C. | | |
|---|---|---|---|
| Feed Conductivity | 7.05 µS/cm, | | |
| Feed $CO_2$ | 16.25 ppm, | | |
| Feed Silica | 237.5 ppb | | |
| Feed FCE | 50.7 µS/cm | | |
| Flow rate | | | |
| 1st stage: | Dilute 5.39 gpm, | Conc | 0.416 gpm |
| 2nd stage: | Dilute 4.92 gpm | Conc | 0.473 gpm |
| | | 3a | 3b |
| Final product | Product resistivity (MΩ-cm) | 18.04 | NA |
| | Silica (DL: 0.1 ppb) | 0.9 ppb | 0.1 |
| | Boron (DL: 0.05 ppb) | 0.057 ppb | ND |
| | Sodium (DL: 0.005 ppb) | 0.5 ppb | ND |

Example 4

The tests of Example 3 were repeated to obtain results at a different water temperature. By using water at an inlet temperature of 17° C., values were obtained that are believed to be indicative of those achievable in a production setting, such as a microelectronics manufacturing facility. $CO_2$ was added to a level of 16.25 ppm, as in Example 3. The results achieved at this temperature using a conventional mixed bed polisher (4b) and those achieved using an embodiment of the invention (4a) are provided in Table 4 below. Results obtained with the embodiment were comparable to those obtained with the conventional mixed bed polisher, and results for weakly ionizable species such as silica and boron were at ppt levels, meeting or exceeding the low-level requirements of many end users. In addition, the level of Total Oxidizable Carbon (TOC) in the feed fluid was reduced from 16.25 ppm to 19 ppb, a reduction of about three orders of magnitude.

TABLE 4

| Feed temperature | 17° C. | | |
|---|---|---|---|
| Feed conductivity | 7.22 µS/cm, | | |
| Feed $CO_2$ | 16.25 ppm | | |
| Feed Silica | 257 ppb | | |
| Feed FCE | 50.9 µS/cm | | |
| Flow rate | | | |
| 1st stage | Dilute 5.19 gpm, | Conc | 0.468 gpm |
| 2nd stage | Dilute 4.76 gpm | Conc | 0.432 gpm |
| | | 4a | 4b |
| Final product | Product resistivity MΩ-cm, | 18.19 | NA |
| | Silica (DL: 0.1 ppb) | 0.3 | ND |
| | Boron (DL: 0.05 ppb | 0.056 | ND |
| | Sodium (DL: 0.005 ppb) | 0.3 | 0.07 |
| | TOC (DL: 5 ppb) | 19 | 14 |

(Note: DL: Detection limit)

Embodiments of the invention may also be used in tandem with other types of water purification devices, for example, reverse osmosis devices and/or water softening systems. These alternative water purification techniques may often benefit from pH adjustment.

Figure 10:
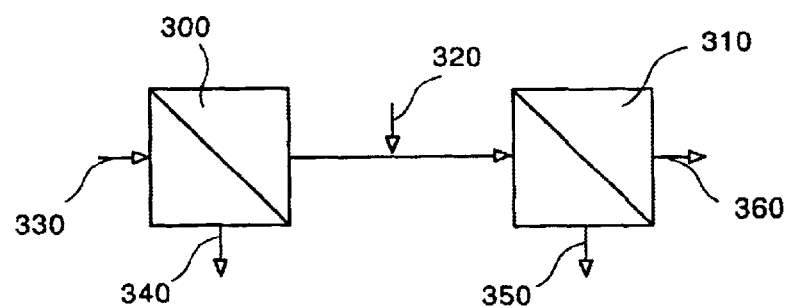
FIG. 10 is a schematic flow diagram of a prior art water treatment system.

FIG. 10 illustrates a known embodiment, such as that described in Re-examined U.S. Pat. No. RE B14,574,049, in which water is fed through an inlet 330 into an RO system 300 and then to a second RO system 310 to produce a purified water at outlet 360. Reject concentrate is received at outlets 340 and 350. A pH adjustment fluid such as sodium hydroxide is injected into the system at inlet 320 in order to adjust the pH of the water being treated before it enters second RO system 360.

Figure 11:
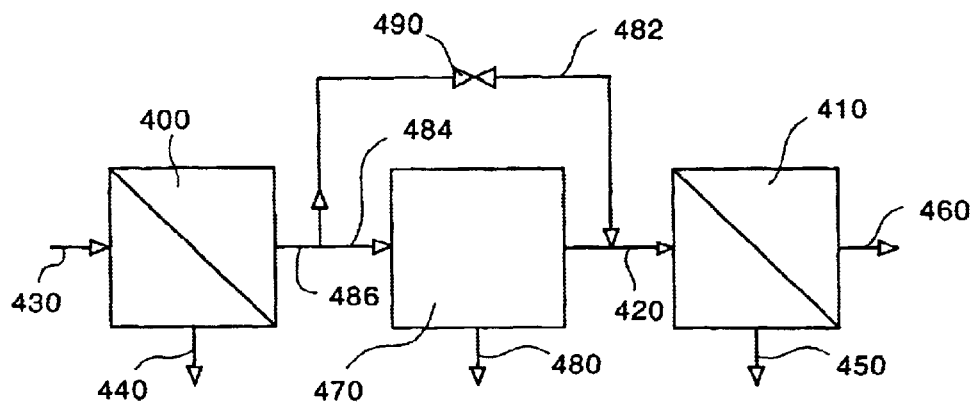
FIG. 11 is a schematic flow diagram of an embodiment of the invention.

FIG. 11 illustrates an embodiment of the invention in which the pH of the fluid passing from a first RO unit to a second RO unit may be adjusted without adding an acid or base and without increasing the conductivity of the fluid. Water first enters RO unit 400 at inlet 430. Reject concentrate from the first RO unit is received at outlet 440 and purified water passes through conduit 486 where it may enter electrodeionization device 470 via conduit 484. Electrodeionization device 470 may contain any configuration of ion exchange materials that allows the pH of the water to be adjusted. For example, the depletion compartments in device 470 may include a layer of cation exchange resin followed by a more extensive layer of anion exchange resin, in order to raise the pH of the fluid. Reject concentrate from the system is passed through outlet 480 and purified water of adjusted pH is passed to second RO unit 410 via conduit 420. The pH adjusted water may provide for more complete removal of, for example, carbon dioxide, when passed through the second RO device 410. Purified water is received through outlet 460 and reject concentrate through outlet 450. The pH of the treated water may be adjusted by varying, for example, the configuration of electrodeionization device 470 or by making electrical adjustments during or prior to operation of the system.

Optionally, bypass loop 482 may be used to adjust the pH of the feed to second RO unit 410, independently of the operation of electrodeionization device 470. The greater the amount of water that passes through bypass loop 482, the greater is the damping effect on the pH of the water treated by electrodeionization device 470. Thus, the pH of the fluid passing through conduit 420 may be monitored and the percentage of flow passing through loop 482 adjusted accordingly. Such adjustment may be manual or automated and valve controller 490 may be employed to make adjustments in flow. As the buffering capacity of purified water may be low, it may be subject to wide swings in pH. Thus, this embodiment may provide a technique for avoiding undesirable pH swings that may occur when an acid or base is added directly to the purified stream, and pH may be finely controlled by both tuning the electrodeionization device 470 and by adjusting the amount of flow through loop 482. In addition, since the pH may be adjusted through the splitting of water molecules and the subsequent removal, not addition, of ions, pH adjustment may be made without increasing the conductivity of the water being treated. Furthermore, the system can be completely sealed from outside sources of possible contamination, such as caustic or acid reservoirs.

In another aspect, a system involving two or more RO units and one or more EDI devices may be used together to provide water of a decreased pH to a first RO unit and water of an elevated pH to a second RO unit. In this manner, one or more EDI devices may be used to decrease the pH for one RO unit and raised the pH for a second RO unit. In addition, such a configuration may aid the reduction of scaling.

Alternatively, the pH of the water feeding the first RO unit may be increased and subsequently decreased for introduction to the second RO unit.

These systems can provide for the removal of both cationic compounds such as silica and boron as well as the removal of anionic compounds such as ammonia. The pH can be adjusted by varying the voltage applied to the EDI module as well as by varying the ratio of ion exchange material within the device. Furthermore, the pH may be both raised and lowered without the addition of chemicals.

Figure 14:
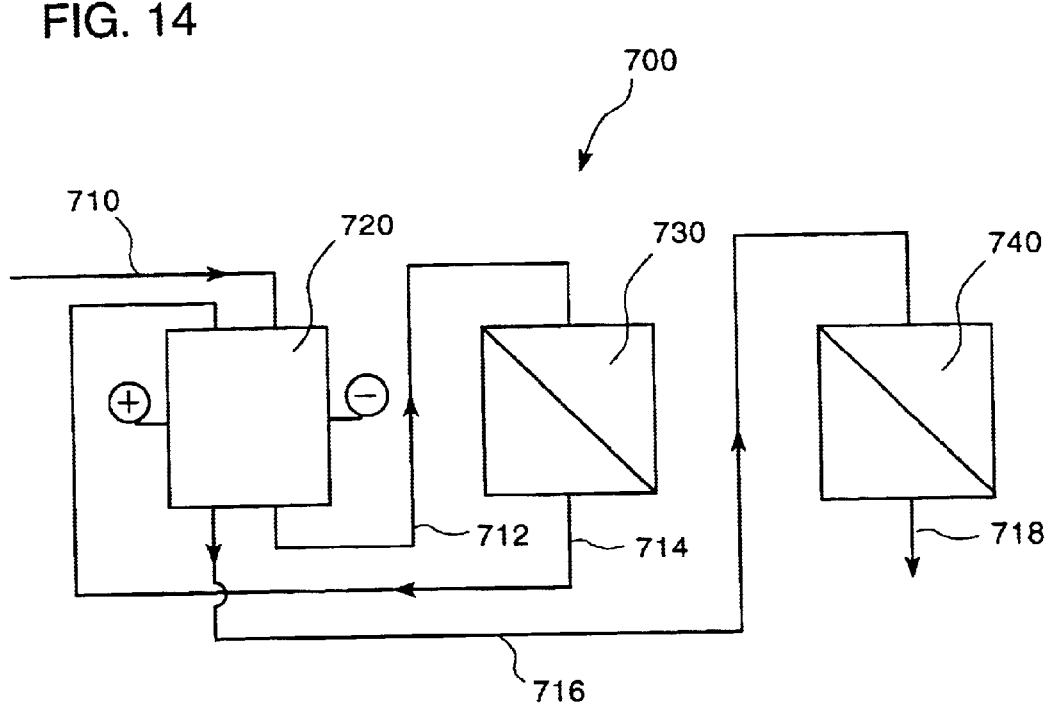
FIG. 14 is a schematic flow diagram of an embodiment of the invention.

FIG. 14 provides a schematic illustration of an embodiment 700 that may provide for the removal of both weakly ionizable anion and weakly ionizable cation species. Initially, feed water is supplied to the system through conduit 710 and is fed to electrodeionization module 720. The pH of the water passing through the electrodeionization module is reduced, for example, by passing the water through a cell containing predominantly cation resin or by adjusting the voltage to the cell in order to increase the amount of water splitting, and therefore the potential for pH adjustment. Water at an adjusted pH, for instance, at 1 or 2 pH units below that of the water passing through conduit 710 exits the cell and EDI unit 720 through conduit 712 and enters a first RO unit 730. At a reduced pH, compounds such as ammonia may be more easily removed by RO and the water exiting the RO unit at conduit 714 may exhibit a lower cation concentration than the water entering the unit. After exiting RO unit 730 the water may be directed through conduit 714 back to electrodeionization unit 720. Alternatively, the water may be directed to an electrodeionization unit that is separate from that used in the earlier process. On this pass, the water may flow through a cell that contains, for example, predominantly anion exchange resin. In this case, the water exiting the electrodeionization module at conduit 716 may be at an elevated pH and thus the water passing through conduit 716 may be at a pH of, for example, one unit or two units higher than that which originally entered conduit 710. This water may be, for example, three to four pH units higher than that which entered the electrodeionization module from the first RO unit through conduit 714. The water then passes through RO unit 740, at an elevated pH, where weakly ionizable anions such as silicate and borate may be removed. Thus, water leaving RO unit 740 through conduit 718 may contain a reduced level of weakly ionizable anionic species, such as silicate and borate, as well as a lower level of weakly ionizable cationic species, such as ammonia. The desired pH at each of the stages in the system may be achieved, for example, by adjusting the ratios of anion and cation resin within the cells and by adjusting the total amount of resin that the water passes through, for instance, by altering the filled volume of the cells within the electrodeionization module. Of course, additional RO units may be employed and any number of electrodeionization modules may be used. The order in which the water passes through each cell may also be altered so that, for example, the water may first pass through a cell containing anion exchange resin.

Further modifications and equivalents of the invention herein disclosed will occur to persons skilled in the art using no more than routine experimentation, and all such modifications and equivalents are believed to be within the spirit and scope of the invention as defined by the following claims.

What is claimed is:

1. An electrodeionization apparatus comprising:
   at least one ion-depletion compartment;
   a first layer of a first ion exchange material positioned in the at least one ion-depletion compartment;
   a second layer of a second ion exchange material positioned adjacent and downstream of the first layer; and
   a third layer comprising anion and cation exchange material positioned adjacent to and downstream of the second layer.

2. The electrodeionization apparatus of claim 1 wherein the first layer comprises cation exchange resin and the second layer comprises anion exchange resin.

3. The electrodeionization apparatus of claim 1 wherein the first layer comprises anion exchange resin and the second layer comprises cation exchange resin.

4. The electrodeionization apparatus of claim 1 wherein the first or second layer comprises cation exchange material and a dopant.

5. The electrodeionization apparatus of claim 4 wherein the dopant comprises anion exchange resin.

6. The electrodeionization apparatus of claim 5 wherein the anion exchange resin is a specialized electroactive media comprising Type I and Type II anion exchange resin.

7. The electrodeionization apparatus of claim 1 wherein the anion exchange material is a specialized electroactive media comprising Type I and Type II anion exchange resin.

8. The electrodeionization apparatus of claim 1 wherein the first or second layer comprises anion exchange material and a dopant.

9. The electrodeionization apparatus of claim 8 wherein the dopant is cation exchange material or electrically active non-ion exchange material.

10. The electrodeionization apparatus of claim 8 wherein the volume of the second layer is about three times the volume of the first layer.

11. The electrodeionization apparatus of claim 8 wherein the volume of the second layer is about three times the volume of the first layer.

12. The electrodeionization apparatus of claim 1 wherein a volume of the second layer is greater than a volume of the first layer.

13. The electrodeionization apparatus of claim 1 wherein a volume of the second layer is greater than a volume of the first layer.

14. An electrodeionization apparatus comprising:
   a first cell comprising anion or cation exchange material;
   a second cell in fluid communication with and downstream of the first cell, the second cell comprising anion or cation exchange material and being different than the exchange material of the first cell; and
   a third cell in fluid communication with and downstream of the second cell, the third cell comprising a mixed ion exchange material.

15. The electrodeionization apparatus of claim 14 wherein the first and second cells are in a common module.

16. The electrodeionization apparatus of claim 15 wherein the third cell is in the common module.

17. The electrodeionization apparatus of claim 14 wherein the second cell is of greater thickness than the first.

18. The electrodeionization apparatus of claim 17 wherein the second cell is greater than about two times the thickness of the first cell.

19. The electrodeionization apparatus of claim 18 wherein the thickness of the second cell is greater than about three times the thickness of the first cell.

20. The electrodeionization apparatus of claim 17 wherein the first cell comprises cation exchange resin.

21. The electrodeionization apparatus of claim 20 wherein the second cell comprises anion exchange resin.

22. The electrodeionization apparatus of claim 14 wherein a current applied to the first cell is independently controllable from a current applied to the second cell.

23. The electrodeionization apparatus of claim 22 wherein a current applied to the third cell is independently controllable from that applied to the first or second cell.

24. The electrodeionization apparatus of claim 14 further comprising a fourth cell positioned downstream of the second cell and upstream of the third cell.

25. The electrodeionization apparatus of claim 24 wherein the fourth cell comprises substantially the same ion exchange material as the second cell.

26. The electrodeionization apparatus of claim 25 wherein the second and fourth cells are in the same module.

27. The electrodeionization apparatus of claim 25 further comprising a fifth cell positioned downstream of the fourth cell and upstream of the third cell.

28. A water purification apparatus comprising:
 a first reverse osmosis device;
 an electrodeionization apparatus in fluid communication with the first reverse osmosis device;
 an anion exchange layer disposed in the electrodeionization apparatus;
 a second reverse osmosis device in fluid communication with the electrodeionization apparatus, the second reverse osmosis device in communication with the first reverse osmosis device via the electrodeionization apparatus; and
 a bypass loop providing fluid communication between the first reverse osmosis device and the second reverse osmosis device.

29. The apparatus of claim 28 further comprising a cation exchange layer positioned between the first reverse osmosis device and the anion exchange layer.

30. A water purification apparatus comprising:
 a first electrodeionization cell comprising ion exchange material;
 a second electrodeionization cell comprising ion exchange material;
 a first reverse osmosis device downstream of the first electrodeionization cell and in fluid communication with the second electrodeionization cell; and
 a second reverse osmosis device downstream of the second electrodeionization cell.

31. The apparatus of claim 30 wherein the first and second electrodeionization cells are in a common electrodeionization module.

32. The apparatus of claim 31 wherein at least one cell is comprised of an ion exchange material comprising a dopant.

33. An electrodeionization device comprising:
 a first ion exchange layer comprising mixed ion exchange material;
 a second ion exchange layer comprising anion exchange material, the second layer adjacent to and downstream of the first layer; and
 a third ion exchange layer consisting essentially of cation exchange material, the third layer adjacent to and downstream of the second layer.

34. The electrodeionization device of claim 33 wherein the first, second and third ion exchange layers are in a common cell.

35. The electrodeionization device of claim 33 wherein each of the ion exchange materials is an ion exchange resin.

36. The electrodeionization device of claim 33 wherein the first ion exchange layer comprises doped cation exchange material.

37. The electrodeionization device of claim 36 wherein each of the first, second and third layers are in a common cell.

38. The electrodeionization device of claim 36 wherein each of the ion exchange materials is an ion exchange resin.

39. The electrodeionization device of claim 36 wherein the first ion exchange layer is doped with anion exchange resin.

40. The electrodeionization device of claim 39 wherein the anion exchange resin comprises type I and type II anion exchange resin.

41. The electrodeionization device of claim 39 wherein the first ion exchange layer is doped with the ion exchange material comprising the second ion exchange layer.

42. The electrodeionization device of claim 39 wherein the first ion exchange layer is doped with less than about 40% dopant material.

* * * * *

UNITED STATES PATENT AND TRADEMARK OFFICE
CERTIFICATE OF CORRECTION

PATENT NO.        : 6,649,037 B2
APPLICATION NO.   : 09/867786
DATED             : November 18, 2003
INVENTOR(S)       : Liang et al.

It is certified that error appears in the above-identified patent and that said Letters Patent is hereby corrected as shown below:

On the cover sheet, (75), add --Lu Wang, West Newton, MA (US); Joseph D. Gifford, Marlborough, MA (US)--.

Signed and Sealed this

Seventh Day of November, 2006

JON W. DUDAS
*Director of the United States Patent and Trademark Office*